(12) United States Patent
Suh

(10) Patent No.: US 11,289,238 B2
(45) Date of Patent: Mar. 29, 2022

(54) COMPOSITIONS FOR THE FILLING OF HIGH ASPECT RATIO VERTICAL INTERCONNECT ACCESS (VIA) HOLES

(71) Applicant: Heraeus Precious Metals North America Conshohocken LLC, West Conshohocken, PA (US)

(72) Inventor: Seigi Suh, Chesterbrook, PA (US)

(73) Assignee: HERAEUS PRECIOUS METALS NORTH AMERICA CONSHOHOCKEN LLC, West Conshohocken, PA (US)

(*) Notice: Subject to any disclaimer, the term of this patent is extended or adjusted under 35 U.S.C. 154(b) by 0 days.

(21) Appl. No.: 16/703,574

(22) Filed: Dec. 4, 2019

(65) Prior Publication Data
US 2021/0174983 A1 Jun. 10, 2021

(51) Int. Cl.
*H01B 1/22* (2006.01)
*C08L 63/00* (2006.01)
(Continued)

(52) U.S. Cl.
CPC ............... *H01B 1/22* (2013.01); *C08K 3/08* (2013.01); *C08L 63/00* (2013.01); *C08K 5/17* (2013.01);
(Continued)

(58) Field of Classification Search
CPC ............ H01B 1/22; C09D 11/52; C08L 63/00
(Continued)

(56) References Cited

U.S. PATENT DOCUMENTS

| 4,999,136 A | 3/1991 | Su et al. |
| 5,786,785 A * | 7/1998 | Gindrup .................. C09D 5/24 342/1 |

(Continued)

FOREIGN PATENT DOCUMENTS

CN 108728010 A * 11/2018 .............. C09J 11/04

OTHER PUBLICATIONS

Applications: Free Radical Initiators, SIGMA-ALDRICH, Nov. 27, 2014 (Nov. 27, 2014), p. 5, [retrieved Oct. 28, 2020 (Oct. 28, 2020) via <https://web.archive.org/web/20141127121307/https://www.sigmaaldrlch.com/contenVdam/slgma-aldrich/docs/Aldrich/General_Information/photoinitiators.pdf>.
(Continued)

*Primary Examiner* — Tri V Nguyen
(74) *Attorney, Agent, or Firm* — Blank Rome LLP

(57) ABSTRACT

A solvent-free electroconductive composition may be used to make electroconductive lines on a surface of a substrate or electroconductive plugs within via holes of a substrate. The solvent-free electroconductive composition is generally made of about 40 to about 95 wt % of a conductive component, about 4 to about 30 wt % of a polymer or oligomer comprising a reactive functional group, up to about 20 wt % of a monomeric diluent comprising a reactive functional group, and up to about 3 wt % of a curing agent. In some instances, the solvent-free electroconductive composition further includes up to about 3 wt % of a lubricating compound. Substrates made using solvent-free electroconductive compositions may be used in printed circuit boards, integrated circuits, solar cells, capacitors, resistors, thermistors, varistors, resonators, transducers, inductors, and multilayer ferrite beads.

9 Claims, 6 Drawing Sheets

(51) Int. Cl.
  *C08K 3/08* (2006.01)
  *C08K 5/17* (2006.01)
  *C08K 5/5415* (2006.01)
  *C08K 7/18* (2006.01)
  *C09D 11/52* (2014.01)

(52) U.S. Cl.
  CPC .............. *C08K 5/5415* (2013.01); *C08K 7/18* (2013.01); *C08K 2003/0806* (2013.01); *C08K 2201/001* (2013.01); *C08K 2201/003* (2013.01); *C09D 11/52* (2013.01)

(58) Field of Classification Search
  USPC .......................... 252/500, 502, 506, 510, 511
  See application file for complete search history.

(56) References Cited

U.S. PATENT DOCUMENTS

| | | | |
|---|---|---|---|
| 2004/0094751 | A1 | 5/2004 | Ogiwara |
| 2014/0332071 | A1* | 11/2014 | Jiang .................. C08F 290/064 136/256 |
| 2017/0137655 | A1 | 5/2017 | Furutachi et al. |
| 2019/0359842 | A1* | 11/2019 | Arakawa .................. H01B 1/22 |
| 2020/0157388 | A1* | 5/2020 | Abe ..................... C08G 59/621 |

OTHER PUBLICATIONS

FR-4, Wikipedia, Oct. 29, 2019 (Oct. 29, 2019), p. 1, [retrieved Oct. 28, 2020 15-16 (Oct. 28, 2020) via <https://en.wikipedia.org/w/index.php?title=FR-4&direction=next&oldid=923520649> ].
ISR and Written Opinion issued in PCT/US20/47665 dated Nov. 20, 2020.

* cited by examiner

COMPOSITIONS FOR THE FILLING OF HIGH ASPECT RATIO VERTICAL INTERCONNECT ACCESS (VIA) HOLES

FIELD OF THE INVENTION

Inventions of the disclosure relate to compositions and methods for the filling of high aspect ratio vertical interconnect access (via) holes. More specifically, the inventions of the disclosure relate to the use of compositions that, after being filled into a via hole, do not shrink during drying or curing processes during fabrication of via hole-containing substrate

BACKGROUND OF THE INVENTION

Conductive via holes are conventionally used as a means for interconnecting regions on one surface of a compound semiconductor substrate, such as a printed circuit board or integrated circuit, to regions on the opposing surface of the semiconducting substrate. In various commercial electronics manufacturing sectors, there is often a need to fill holes in various substrates for forming vias and interconnects. The hole filling process is affected by a number of processing and material parameters such as the diameter of the via hole, the depth of the hole, and the type of the substrate material. A number of techniques have been used to perform the via hole filling process. Depending on the type of the substrate, the techniques may include electroplating, electroless plating, injection molding (both pressurized and vacuum) solder paste screen printing and conductive paste screen printing.

To date, the filling of high aspect ratio (i.e., a high depth-to-width ratio) via holes, such as those have aspect ratios of 5:1 or greater, has proved problematic. Even more problematic, is the filling of via holes having diameters (widths) of less than 100 micrometers. Via holes having such high aspect ratios and small diameters do not allow for effective filling of via holes using the conventional techniques referenced above.

In some instances, via holes are filled with a composition having conductive metal particles, a polymer material and solvent. Such compositions have been found disadvantageous, however, because during drying or curing, the solvent evaporates and the resulting conductive particle-polymeric material composite (the "via plug") incompletely fills the via hole, leaving gaps or voids between the via plug and the wall of the via.

Therefore, this disclosure is directed to compositions and methods for effectively filling high aspect ratio via holes in compound semiconducting substrates.

SUMMARY OF THE INVENTION

The invention provides a solvent-free electroconductive composition for the fabrication of electroconductive lines, patterns or contacts on a surface of a substrate, or electroconductive plugs within via holes of a substrate. The solvent-free electroconductive composition is generally made of about 40 to about 95 wt % of a conductive component, about 4 to about 30 wt % of a polymer or oligomer comprising a reactive functional group, up to about 20 wt % of a monomeric diluent comprising a reactive functional group, and up to about 3 wt % of a curing agent. In some instances, the solvent-free electroconductive composition further includes up to about 3 wt % of a lubricating compound. Solvent-free electroconductive compositions have been found superior to other prior art electroconductive pastes or inks because they exhibit very little or no shrinkage when cured to form a hardened electroconductive material, form hardened electroconductive material without cracks, voids or other detrimental physical properties, and uniformly or substantially uniformly contact the surface of a substrate. Solvent-free electroconductive compositions have been found superior to other prior art electroconductive pastes or inks because they effectively fill high aspect ratio via holes that have a depth to width aspect ratio of at least 5:1 and diameters of 100 µm or less. In some instances, electroconductive compositions described herein may be used to fill via holes which have diameters of 80 µm or less, alternatively 60 µm or less, alternatively 40 µm or less, and alternatively 20 µm or less. In some instances, electroconductive ink or paste compositions described herein may be used to fill via holes which have aspect ratios of 6:1 or greater, alternatively 7:1 or greater, alternatively 8:1 or greater, alternatively 9:1 or greater, alternatively 10:1 or greater, alternatively 15:1 or greater.

In some instances, solvent-free electroconductive compositions are prepared as a paste. In some instances, solvent-free electroconductive compositions are prepared as an ink.

In some instances, the conductive component of solvent-free electroconductive compositions is a plurality of metallic particles. Suitable metallic particles include at least one of silver, copper, gold, aluminum, nickel, platinum, palladium, tin, molybdenum, and mixtures, alloys or core-shell structures thereof. In some instances, the metallic particles comprise silver. In some instances, the metallic particles consist of silver. In some instances, the metallic particles consist essentially of silver. In some instances, the metallic particles may be silica particles, alumina particles or graphite particles coated with a suitable metal. In some instances, at least a portion of the metallic particles are spherical or substantially spherical. Generally, the metallic particles have a $D_{50}$ from about 100 nm to about 5.0 µm. In some instances, the conductive metal particles may have a $D_{50}$ of anywhere from about 1.5 µm to about 2.5 µm, alternatively from about 1.0 µm to about 3.0 µm, and alternatively from about 500 nm to about 3.5 µm.

The polymer or oligomer of solvent-free electroconductive compositions includes at least one reactive functional group. The reactive functional group may be an epoxy, an alkene, a hydroxyl, a carboxylic acid, a carboxylate, an amine, an amide, an isocyanate, an imide, an anhydride or an acrylate. In some instances, the polymer or oligomer has more than one type of reactive functional group. The reactive functional group of the polymer or oligomer is selected for its capability to cross-link or otherwise chemically bind with a reactive functional group of the monomeric diluent during drying or curing after placement on a surface of a substrate or within a via hole of a substrate.

The monomeric diluent of solvent-free electroconductive compositions includes a reactive functional group. The reactive functional group may be an epoxy, an alkene, a hydroxyl, a carboxylic acid, a carboxylate an amine, an amide, an isocyanate, an imide, an anhydride, or an acrylate. The reactive functional group of the monomeric diluent is selected for its capability to cross-link or otherwise chemically bind with a reactive functional group of the polymer or oligomer during drying or curing after placement on a surface of a substrate or within a via hole of a substrate. In some instances, the reactive functional groups of the monomeric diluent and the polymer or oligomer are of the same or substantially similar. In some instances, the reactive functional groups of the monomeric diluent and the polymer or oligomer are different.

The curing agent of solvent-free electroconductive compositions may be thermally curable, ultraviolet (UV) curable or curable by any other suitable energy input. The curing agent may be an epoxy, a hydroxyl, a carboxylic acid, an amine, an isocyanate, an imide, an aziridine, an amide, an organic imidazole, a melamine formaldehyde, an anhydride, an amine-Lewis acid adduct, or a radical initiator. In some instances, the curing agent is a combination curing agents described above.

A substrate may include a via hole and an electroconductive plug in at least partially filling the via hole. The electroconductive plug may be formed by injecting or otherwise disposing a solvent-free electroconductive composition in accordance with the disclosure and curing the solvent-free electroconductive composition. In some instances, curing may take place at a temperature from about 100 to about 400° C. In some instances, curing may take place over a period of time ranging from about 5 minutes to about 2 hours. In some instances, curing may take place at more than one temperature over time. For example, in some instances, curing may take place at a first temperature for a first period of time followed by a second temperature for a second period of time. In accordance with the examples, the first temperature and first period of time is 200° C. and 10 minutes, and the second temperature and second period of time is 300° C. and 60 minutes. In some instances, the first temperature may range from about 100 to about 250° C. In some instances, the first period of time may range from about 5 minutes to about 30 minutes. In some instances, the second temperature may range from about 250 to about 400° C. In some instances, the second period of time may range from about 5 minutes to about 90 minutes. In some instances, curing may take place by a direct transition from the first temperature to the second temperature. In other instances, curing may take place by a ramped transition from the first temperature to the second temperature over a period of about 1 to about 20 minutes.

Solvent-free electroconductive compositions have been found to be effective in the formation of electroconductive plugs in via holes that have a depth to width aspect ratio of at least 5:1 and diameters of 100 µm or less. In some instances, electroconductive compositions described herein may be used to fill via holes which have diameters of 80 µm or less, alternatively 60 µm or less, alternatively 40 µm or less, and alternatively 20 µm or less. In some instances, electroconductive ink or paste compositions described herein may be used to fill via holes which have aspect ratios of 6:1 or greater, alternatively 7:1 or greater, alternatively 8:1 or greater, alternatively 9:1 or greater, alternatively 10:1 or greater, alternatively 15:1 or greater.

Substrates having via holes with electroconductive plugs formed therein from electroconductive compositions may be incorporated as a component of any one of a printed circuit board (PCB), an integrated circuit, a solar cell, a capacitor, a resistor, a thermistor, a varistor, a resonator, a transducer, an inductor, and a multilayer ferrite bead.

A substrate may include a surface and an electroconductive line, pattern, or contact on at least a portion of the substrate surface. The electroconductive line, pattern, or contact may be formed on the substrate surface disposing a solvent-free electroconductive composition according to the disclosure on the substrate of the surface and curing the solvent-free electroconductive composition. In some instances, curing may take place at a temperature from about 100 to about 400° C. In some instances, curing may take place over a period of time ranging from about 5 minutes to about 2 hours. In some instances, curing may take place at more than one temperature over time. For example, in some instances, curing may take place at a first temperature for a first period of time followed by a second temperature for a second period of time. In accordance with the examples, the first temperature and first period of time is 200° C. and 10 minutes, and the second temperature and second period of time is 300° C. and 60 minutes. In some instances, the first temperature may range from about 100 to about 250° C. In some instances, the first period of time may range from about 5 minutes to about 30 minutes. In some instances, the second temperature may range from about 250 to about 400° C. In some instances, the second period of time may range from about 5 minutes to about 90 minutes. In some instances, curing may take place by a direct transition from the first temperature to the second temperature. In other instances, curing may take place by a ramped transition from the first temperature to the second temperature over a period of about 1 to about 20 minutes.

Substrates having electroconductive lines, patterns, or contacts formed thereon from electroconductive compositions according to this disclosure may be incorporated as a component of any one of a printed circuit board (PCB), an integrated circuit, a solar cell, a capacitor, a resistor, a thermistor, a varistor, a resonator, a transducer, an inductor, and a multilayer ferrite bead.

In some instances, an electroconductive composition may be applied on a surface of a substrate, or within a via hole of a substrate, by screen-printing. In other instances, techniques such as doctor-blading, dip-coating, spin-coating, inkjet printing, pneumatic spray printing, pad printing, dot matrix printing, laser printing, 3D printing, or any other suitable application technique may be used.

In some instances, the substrate, with or without via holes, may be a ceramic, glass or coated glass. In some instances, the substrate, with or without via holes, may be made of a conductive or non-conductive polymer. In some instances, the substrate, with or without via holes, may be a silicon, a copper indium gallium sulfide/selenide ($Cu(In,Ga)(S,Se)_2$, or "CIGS"), a cadmium telluride, a copper zinc tin sulfide (CZTS), a silver zinc tin sulfide (AZTS), and gallium arsenide.

BRIEF DESCRIPTION OF THE DRAWINGS

The following schematic drawings show aspects of the invention for improving the understanding of the invention in connection with some exemplary illustrations, wherein.

DETAILED DESCRIPTION

Figure 1:
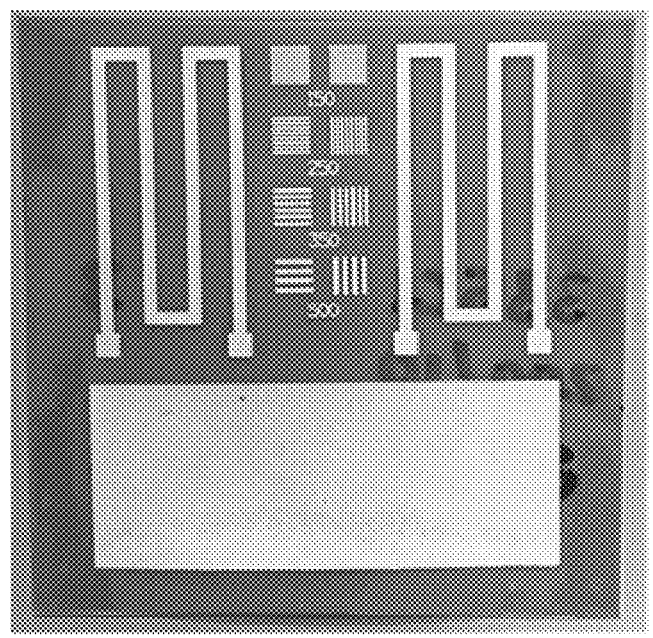
FIG. 1 is an image of a substrate having electroconductive lines formed thereon, the electroconductive lines formed by applying an electroconductive composition curing the electroconductive composition.

The following description of the embodiments is merely exemplary in nature and is in no way intended to limit the subject matter of the disclosure, their application, or uses.

As used throughout, ranges are used as shorthand for describing each and every value that is within the range. Any value within the range may be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term may be construed as including a deviation of ±10 percent, alternatively ±5 percent, alternatively ±1 percent, alternatively ±0.5 percent, and alternatively ±0.1 percent of the given numeric value provided such a deviation does not alter the end function or result of the value. Accordingly, unless indicated to the contrary, the numerical parameters set forth in this specification and attached claims are approximations that may vary depending upon the desired properties sought to be obtained by the invention. The term "substantially" is defined to be essentially conforming to the particular dimension, shape or other word that substantially modifies, such that the component need not be exact. For example, "substantially spherical" means that the object resembles a sphere, but may have one or more deviations from a true sphere.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that may be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

In accordance with various aspects of the disclosure, a solvent-free thick film ink or paste composition for use in the filling of a via hole of a substrate includes a combination of a conductive component, a polymer or oligomer having a functional group capable of cross-linking, a monomeric diluent having a functional group capable of cross-linking, and a curing agent. In some instances, the conductive component may be from about 40 to about 95 wt % of the thick film ink or paste composition. In other instances, the conductive component may be from about 50 to about 95 wt %, alternatively from about from about 60 to about 95 wt %, alternatively from about 70 to about 90 wt %, alternatively from about 80 to about 90 wt %, and alternatively from about 85 to about 90 wt % of the thick film ink or paste composition. In some instances, the polymer or oligomer may be from about 4 to about 30 wt % of the thick film ink or paste composition. In other instances, the polymer or oligomer may be from about 4.5 to about 25 wt %, alternatively from about from about 5 to about 20 wt %, alternatively from about 5.5 to about 15 wt %, alternatively from about 6 to about 10 wt %, and alternatively from about 7 to about 9 wt % of the thick film ink or paste composition. In some instances, the monomeric diluent may be from about 0 to about 20 wt % of the thick film ink or paste composition. In other instances, the monomeric diluent may be from about 0.1 to about 20 wt %, alternatively from about from about 0.25 to about 15 wt %, alternatively from about 0.5 to about 10 wt %, alternatively from about 0.75 to about 5 wt %, and alternatively from about 1 to about 3 wt % of the thick film ink or paste composition. In some instances, the curing agent may be from about 0 to about 10 wt % of the thick film ink or paste composition. In other instances, the curing agent may be from about 0.01 to about 10 wt %, alternatively from about from about 0.1 to about 5 wt %, alternatively from about 0.2 to about 2.5 wt %, alternatively from about 0.3 to about 1 wt %, and alternatively from about 0.4 to about 0.6 wt % of the thick film ink or paste composition.

In accordance with various aspects of the disclosure, a solvent-free thick film ink or paste composition for use in the filling of a via hole of a substrate includes a combination of a conductive component, a polymer or oligomer having a functional group capable of cross-linking, a monomeric diluent having a functional group capable of cross-linking, a curing agent and a lubricating compound. When a lubricating compound is used in a thick film ink or paste composition, the lubricating compound may be from about 0 to about 3 wt %, alternatively from about 0.1 to about 2.5 wt %, and alternatively from about 0.25 to about 2 wt % of the thick film ink or paste composition.

Conductive Component

The conductive component of pastes generally includes conductive metallic particles. The conductive component may generally be in the form of a powder. Preferred conductive metallic particles are those which exhibit optimal conductivity and dispersibility within the paste. Conductive metallic particles include, but are not limited to, elemental metals, alloys, mixtures of at least two metals, mixtures of at least two alloys or mixtures of at least one metal with at least one alloy. Metals which may be employed as the metallic particles include at least one of silver, copper, gold, aluminum, nickel, platinum, palladium, tin, molybdenum, and mixtures or alloys thereof. In a preferred embodiment, the metallic particles are silver. The silver particles may be present as elemental silver, one or more silver derivatives, or mixtures thereof. Silver powders may vary based on the production method, purity, particle size, particle shape, apparent density, conductivity, oxygen level, color and flow rate.

In some instances, metallic particles at least partially coated with another metal (a "core-shell particle") may be used. When core-shell particles are used, each of the core and shell may be made of a metal or alloy such as, but not limited to silver, gold, platinum, palladium, copper, iron, aluminum, zinc, nickel, brass or bronze. Broadly, a core-shell particle will have a less conductive core covered by a more conductive coating or shell. Alternately, a less noble metal core is covered by more noble metal coating or shell. Ag coated Cu or Ag coated Cu alloys, or Ag coated Ni or Ag coated Ni alloys are good examples. They offer cost benefit as well as better leach resistance than Ag particles. Moreover, more noble metal coating improves the oxidation resistance of the less noble metal. In some instances, the core of a core-shell particle is made of a composition selected from the group consisting of nickel, nickel alloys, copper, copper alloys, non-noble transition metals, alloys of non-noble transition metals, polymers, silica, alumina, glass, graphite and combinations thereof. Single-metal particles may be envisioned, indirectly in the case where the core and shell are the same metal. In particular, the core-shell particles of the invention may be silver coated nickel particles, silver coated copper particles, silver coated polymer particles, silver coated silica particles, silver coated alumina particles, silver coated glass particles, silver coated graphite particles, gold coated nickel particles, gold coated copper particles, gold coated polymer particles, gold coated silica particles, gold coated alumina particles, gold coated glass particles, gold coated graphite particles, platinum coated nickel particles, platinum coated copper particles, platinum coated polymer particles, platinum coated silica particles, platinum coated alumina particles, platinum coated glass particles, platinum coated graphite particles, palladium coated nickel particles, palladium coated copper particles, palladium coated polymer particles, palladium coated silica particles, palladium coated alumina particles, palladium coated glass particles, palladium coated graphite particles, and combinations thereof. In a preferred embodiment, the core is copper and the shell is silver.

The conductive metallic particles may exhibit a variety of general shapes, surfaces, sizes, surface area to volume ratios, oxygen content and oxide layers. Some examples of general shapes include, but are not limited to, round or spherical, angular, irregular, and elongated (rod or needle like). Silver particles may also be present as a combination of particles of different shapes, sizes and/or surface area to volume ratios. In a preferred embodiment, the conductive metal particles are spherical or substantially spherical.

Typically, particles in any given sample of conductive particles do not exist in a single size, but are distributed in a range of sizes, i.e., a particle size distribution (PSD). One parameter characterizing PSD is $D_{50}$. $D_{50}$ is the median diameter or the medium value of the PSD. It is the value of the particle diameter at 50% in the cumulative distribution. Other parameters of PSD are $D_{10}$, which represents the particle diameter corresponding to 10% cumulative (from 0 to 100%) undersize PSD, and $D_{90}$, which represents the particle diameter corresponding to 90% cumulative (from 0 to 100%) undersize PSD. PSD may be measured via laser diffraction, dynamic light scattering, imaging, electrophoretic light scattering, or any other methods known to one skilled in the art. In a preferred embodiment, laser diffraction is used.

In some instances, the conductive metal particles have a $D_{50}$ of about 2 micrometers (μm). In other instances, the conductive metal particles may have a $D_{50}$ of anywhere from about 1.5 μm to about 2.5 μm, alternatively from about 1.0 μm to about 3.0 μm, alternatively from about 500 nm to about 3.5 μm, alternatively from about 250 nm to about 4.0 μm, alternatively from about 100 nm to about 5.0 μm, and alternatively from about 50 nm to about 10.0 μm.

Polymer or Oligomer

The polymer or oligomer of pastes includes a functional group that is capable of cross-linking or otherwise chemically binding with the monomeric diluent during drying or curing after placement within a via hole. The polymer or oligomer is preferably in liquid form under ambient temperature and atmospheric pressure. In some instances, the functional group is any one of an epoxy, an alkene, a hydroxyl, a carboxylic acid or carboxylate, an amine, an amide, an isocyanate, an imide, an anhydride or an acrylate.

In some instances, suitable oligomers include but are not limited to, octaethylene glycol, dodecaethylene glycol, O-methyl-heptaethylene glycol, O-(2-azidoethyl)heptaethylene glycol, octacosaethylene glycol, O-(2-azidoethyl)nonadecaethylene glycol, O-(2-tert-butyloxycarbonylethyl)dodecaethylene glycol, O-methyl-undecaethylene glycol, tetraethylene glycol, HO-PEG12-OH, mPEG12-OH, mPEG7-OH, mPEG6-OH, O-(2-Carboxyethyl)-O'-(2-mercaptoethyl)heptaethylene glycol, O-(2-carboxyethyl)-O'-methyl-undecaethylene glycol, O,O'-bis(2-carboxyethyl)dodecaethylene glycol, HO-PEG4-propionic acid, mPEG12-propionic acid, propionic acid-PEG4-propionic acid, O-(2-aminoethyl)-O'-(2-azidoethyl)nonaethylene glycol, O-(2-aminoethyl)-O'-(2-azidoethyl)pentaethylene glycol, O-(2-aminoethyl)-O'-(2-azidoethyl)heptaethylene glycol, O-(2-carboxyethyl)-O'-(2-mercaptoethyl)heptaethylene glycol, O,O'-Bis(2-aminoethyl)octadecaethylene glycol, methoxypolyethylene glycol amine epoxyacrylate oligomer (CAS #71281-65-7), and 2-carboxyethyl acrylate oligomers (n=0-3, CAS #24615-84-7), $NH_2$-PEG12-Propionic acid, $NH_2$-PEG8-propionic acid, $NH_2$-PEG4-Propionic acid, HO-PEG12-COOH, mPEG12-acrylate, mPEG5-acrylate, mPEG6-acrylate mPEG7-acrylate, mPEG12-propionic acid, mPEG6-propionic acid, mPEG7-propionic acid, an epoxy-functionalized silicone or cyclosiloxane-based oligomer, an acrylate-functionalized silicone or cyclosiloxane-based oligomer, a methacrylate-functionalized silicone or cyclosiloxane-based oligomer, an amine-functionalized silicone or cyclosiloxane-based oligomer, an allyl- or vinyl-functionalized silicone or cyclosiloxane-based oligomer, or a carboxylic acid-functionalized silicone or cyclosiloxane-based oligomer.

In some instances, the polymer may be a monofunctional polyethylene glycol (PEG) having an epoxy, an alkene, a hydroxyl, a carboxylic acid, an amine, an amide, an isocyanate, an imide, an anhydride or an acrylate functional group. Examples of suitable monofunctional PEG polymers include, but are not limited to poly(ethylene glycol) methyl ether acrylate ($M_n$ ranging from 2,000-5,000), methoxypolyethylene glycol amine ($M_n$ ranging from 750-20,000), poly(ethylene glycol) methyl ether amine ($M_n$=500-2,000), methoxypolyethylene glycol 5,000 acetic acid, methoxypolyethylene glycol 5,000 propionic acid, O-[2-(3-Succinylamino)ethyl]-O'-methyl-polyethylene glycol ($M_n$~20,000), O-(2-carboxyethyl)-O'-methyl-undecaethylene glycol ($M_n$~5,100), poly(ethylene glycol) methyl ether ($M_n$ ranging from 550-20,000), mPEG-isocyanate ($M_n$~5,000), poly(ethylene glycol) octyl ether, and poly(ethylene glycol) methyl ether methacrylate ($M_n$=300-4,000).

In some instances, the polymer may be a homobifunctional polyethylene glycol (PEG) having an epoxy, an alkene, a hydroxyl, a carboxylic acid, an amine, an amide, an isocyanate, an imide, an anhydride or an acrylate functional group. Examples of suitable homobifunctional PEG polymers include, but are not limited to poly(ethylene glycol) diacrylamide ($M_n$~3,700), acrylate-PEG3500-acrylate, poly(ethylene glycol) diacrylate ($M_n$=250-20,000), bis(3-aminopropyl) terminated PEG ($M_n$~1,500), bis(amine) terminated PEG ($M_n$=2,000-20,000), poly(ethylene glycol) diglycidyl ether ($M_n$=500-6,000), poly(ethylene glycol) dimethacrylate ($M_n$~550-20,000), poly(ethylene glycol) bis(carboxymethyl) ether ($M_n$=250-600), and poly(ethylene glycol) divinyl ether ($M_n$~250).

In some instances, the polymer may be a heterobifunctional polyethylene glycol (PEG) having an epoxy, an alkene, a hydroxyl, a carboxylic acid, an amine, an amide, an isocyanate, an imide, an anhydride or an acrylate functional group. Examples of suitable heterobifunctional PEG polymers include, but are not limited to poly(ethylene glycol) 2-aminoethyl ether acetic acid ($M_n$=1,100-10,100), O-(2-aminoethyl)polyethylene glycol ($M_n$=3,000-10,000), O-(2-carboxyethyl)polyethylene glycol ($M_n$=3,000-10,000), poly(ethylene glycol) methacrylate ($M_n$=360-500), poly(ethylene glycol) tetrahydrofurfuryl ether ($M_n$~200), and poly(ethylene glycol) phenyl ether acrylate ($M_n$~324).

In some instances, the polymer may be a polyethylene glycol (PEG) copolymer having an epoxy, an alkene, a hydroxyl, a carboxylic acid, an amine, an amide, an isocyanate, an imide, and anhydride or an acrylate functional group. Examples of suitable PEG copolymers include, but are not limited to allyl-terminated PEGs, PEG-diamines, poly(ethylene glycol)-block-poly(ε-caprolactone) methyl ether ($M_n$=10,000-37,000), poly(ethylene glycol) behenyl ether methacrylate, polyethylene-block-poly(ethylene glycol) ($M_n$=575-2,250), Poloxamer 188 (CAS #9003-11-6), poly(ethylene glycol)-block-poly(propylene glycol)-block-poly(ethylene glycol) ($M_n$=1,100-14,600), O,O'-bis(2-aminopropyl) polypropylene glycol-block-polyethylene glycol-block-polypropylene glycol ($M_n$=500-1,900), Poly(propylene glycol)-block-poly(ethylene glycol)-block-poly(propylene glycol ($M_n$=2,000-3,300), glycerol propoxylate-block-ethoxylate ($M_n$=4,000-5,300), 4-arm poly(ethylene oxide)-block-polycaprolactone (CAS #30174-06-2), 4-arm poly(ethylene oxide)-block-polylactide (MDL #MFCD03792530), poly(ethylene glycol-ran-propylene glycol) ($M_n$=2,500-12,000), and poly(ethylene glycol-ran-propylene glycol) monobutyl ether ($M_n$~3,900).

In some instances, the polymer may be a block copolymer having an epoxy, an alkene, a hydroxyl, a carboxylic acid, an amine, an amide, an isocyanate, an imide, an anhydride or an acrylate functional group. Examples of suitable diblock copolymers include, but are not limited to, poly(styrene)-block-poly(acrylic acid), polystyrene-block-polybutadiene-block-polystyrene, polystyrene-block-poly(ethylene-ran-butylene)-block-polystyrene-graft-maleic anhydride, and polystyrene-block-polyisoprene-block-polystyrene.

In some instances, the polymer may be a π-conjugated polymer having an epoxy, an alkene, a hydroxyl, a carboxylic acid, an amine, an amide, an isocyanate, an imide, an anhydride or an acrylate functional group. In some instances, suitable π-conjugated polymers include, but are not limited to, polyaniline ($M_n$=5,000-100,000), poly(2,5-pyridine) (MDL #MFCD08705354), poly(3,5-pyridine) (CAS #97702-63-1), and a doped or undoped polypyrrole.

In some instances, the polymer may be a bisphenol A polymer or an epoxy prepolymer resin. Suitable bisphenol A polymers or epoxy prepolymer resins include, but are not limited to, poly(bisphenol A-co-epichlorohydrin) ($M_n$~40,000), and glycidyl end-capped poly(bisphenol A-co-epichlorohydrin) ($M_n$=355-1,075). In some instances, the polymer may be a formaldehyde, epoxy or urethane copolymer having an epoxy, an alkene, a hydroxyl, a carboxylic acid, an amine, an isocyanate, an imide or an acrylate functional group. Suitable formaldehyde polymers may include, but are not limited to, poly[(o-cresyl glycidyl ether)-co-formaldehyde] ($M_n$=870-1,070), poly(glycidyl methacrylate) ($M_n$=10,000-20,000), methylated or isobutylated poly(melamine-co-formaldehyde) (CAS #'s 68002-20-0; 68002-21-1), poly[(phenyl glycidyl ether)-co-formaldehyde] ($M_n$=345-570), poly[(phenyl isocyanate)-co-formaldehyde] ($M_n$ ranging from about 340-400), poly(hexamethylene diisocyanate) (CAS #28182-81-2), tolylene 2,4-diisocyanate terminated poly(propylene glycol) ($M_n$~2,300, CAS #9057-91-4), poly(propylene glycol) acrylate, poly(propylene glycol) dimethacrylate and a polyurethane.

In some instances, the polymer may be a hydrophilic polymer having an epoxy, an alkene, a hydroxyl, a carboxylic acid, an amine, an amide, an isocyanate, an imide, an anhydride or an acrylate functional group. In some instances, suitable hydrophilic polymers may include poly(N-isopropylacrylamide) (PNIPAM) and polyacrylamide (PAM) polymers or copolymers such as, but not limited to poly(N-isopropylacrylamide-co-methacrylic acid) methacrylic acid ($M_n$ ranging from 8,000-60,000), poly(N-isopropylacrylamide-co-acrylic acid) acrylic acid, poly(N-isopropylacrylamide-co-acrylamide) acrylamide ($M_n$=20,000-25,000), poly(N-isopropylacrylamide-co-methacrylic acid-co-octadecyl acrylate) ($M_n$=30,000-60,000), carboxylic acid terminated poly(N-isopropylacrylamide) ($M_n$=2,000-10,000), amine terminated poly(N-isopropylacrylamide) ($M_n$=2,000-5,500), poly(acrylamide), and poly(acrylamide-co-acrylic acid). In some instances, suitable hydrophilic polymers may include polyethylenimines. In some instances, suitable hydrophilic polymers can include polyvinyl alcohols ($M_n$=8,000-200,000) or poly(vinyl alcohol-co-ethylene) ethylene copolymers. In some instances, suitable hydrophilic polymers may include poly(vinyl pyrrolidones), polyacrylic acids, polyallylamines, a poly(methyl vinyl ether-alt-maleic acid), poly(2-hydroxyethyl methacrylate), poly(methyl methacrylate-co-methacrylic acid), poly(acrylic acid-co-maleic acid), poly(2-ethylacrylic acid), and polyepoxysuccinic acids.

In some instances, the polymer may be a hydrophobic polymer having an epoxy, an alkene, a hydroxyl, a carboxylic acid, an amine, an amide, an isocyanate, an imide, an anhydride or an acrylate functional group. In some instances, suitable hydrophobic polymers include, but are not limited to, polybutadienes, dicarboxy-terminated polybutadienes, hydroxyl-terminated polybutadienes, polyisoprenes, polyisoprene-graft-maleic anhydrides, hydroxyl-terminated polypropylene glycols, 2-aminopropyl ether-terminated polypropylene glycols, methacrylate-terminated polypropylene glycols, glycidyl ether-terminated polypropylene glycols, polypropylene-graft-maleic anhydrides, poly(ethylene-co-acrylic acid) acrylic acids, polyethylene-co-glycidyl methacrylates, polyethylene-graft-maleic anhydrides, poly(ethylene-co-methacrylic acid), polyethylene monoalcohols, poly(ethylene-co-methyl acrylate-co-glycidyl methacrylate), poly(isobutylene-alt-maleic anhydride), poly(maleic anhydride-alt-1-octadecene), poly(styrene-co-allyl alcohol), poly(styrene-co-maleic anhydride), poly(styrene-co-methacrylic acid), poly(styrene-co-acrylic acid), poly(4-vinylphenol), poly(4-vinylphenol-co-methyl methacrylate), poly(vinyl butyral-co-vinyl alcohol-co-vinyl acetate), poly(2-vinylpyridine), poly(4-vinylpyridine), poly(4-vinylpyridine-co-butyl methacrylate), poly(4-vinylpyridine-co-styrene), polyvinylpyrrolidone, In some instances, the polymer may be a polysiloxane having an epoxy, an alkene, a hydroxyl, a carboxylic acid, an amine, an amide, an isocyanate, an imide, an anhydride or an acrylate functional group. In some instances, suitable polysiloxanes include, but are not limited to, epoxy-functionalized polysiloxanes such as, but not limited to, poly[dimethylsiloxane-co-(2-(3,4-epoxycyclohexyl)ethyl) methylsiloxane] ($M_n$~3,600), diglycidyl ether-terminated poly(dimethylsiloxane) ($M_n$~800), monoglycidyl ether terminated poly(dimethylsiloxane) ($M_n$~5,000); alkene-functionalized polysiloxanes such as, but not limited to, divinyl terminated poly(dimethylsiloxane-co-diphenylsiloxane ($M_n$~9,300), vinyl-terminated poly(dimethylsiloxane) ($M_n$~25,000); hydroxyl-functionalized polysiloxanes such as, but not limited to, poly[dimethylsiloxane-co-[3-(2-(2-hydroxyethoxy)ethoxy)propyl]methylsiloxane], hydroxy terminated poly(dimethylsiloxane) ($M_n$=550-110,000), amine-functionalized polysiloxanes such as, but not limited to, poly[dimethylsiloxane-co-(3-aminopropyl)methylsiloxane] ($M_n$~4,400), bis(3-aminopropyl) terminated poly(dimethylsiloxane) ($M_n$~2,500-27,000); and acrylate-functionalized polysiloxanes such as, but not limited to, monoacrylamidopropyl-terminated poly(dimethylsiloxane) ($M_n$~1,200).

In some instances, the polymer may be an epoxy phenol novolac resin. An example of a suitable epoxy phenol novolac resin includes Epalloy® 8250 [EEW (g/eq=165-178), viscosity (cps)=18,000-28,000@25° C., CVC Thermoset Specialties] having the general chemical structure:

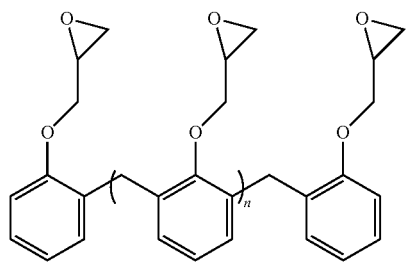

Monomeric Diluent

The monomeric diluent of pastes includes a functional group that is capable of cross-linking or otherwise chemically binding with the polymer or oligomer during drying or curing after placement within a via hole. The monomeric diluent is preferably in liquid form under ambient temperature and atmospheric pressure. In some instances, the functional group is any one of an epoxy, an alkene, a hydroxyl, a carboxylate or carboxylic acid, an amine, an amide, an imide, an isocyanate, an anhydride or an acrylate. In some instances, the monomeric diluent may contain a combination these functional groups.

In some instances, suitable epoxies include, but are not limited to, ethyl glycidyl ether, n-butyl glycidyl ether, cresyl glycidyl ether, 2-ethyl hexyl glycidyl ether, a $C_8$-$C_{10}$ alkyl glycidyl ether, a $C_{10}$-$C_{12}$ alkyl glycidyl ether, a $C_{12}$-$C_{13}$ alkyl glycidyl ether, a $C_{12}$-$C_{14}$ alkyl glycidyl ether, p-tertiary butyl phenol glycidyl ether, benzyl glycidyl ether, tert-butyldimethylsilyl glycidyl ether, neodecanoic acid glycidyl ether, 2-biphenylyl glycidyl ether, neopentyl glycol diglycidyl ether, 1,4-butanediol diglycidyl ether, cyclohexane dimethylol diglycidyl ether, propylene glycol diglycidyl ether, resorcinol diglycidyl ether, glycerol triglycidyl ether, trimethylol propane triglycidyl ether, 4-vinyl-1-cyclohexene 1,2-epoxide, styrene oxide, 3,3-dimethyl-1,2-epoxybutane, 2-hexadecyloxirane, glycidol, epibromohydrin, epichlorohydrin, epifluorohydrin, ethyl 2,3-epoxypropionate, 3,4-epoxy-1-cyclohexene, 7-oxabicyclo[2.2.1]heptane, glycidyl methacrylate, 1,2-epoxycycloheptane, glycidaldehyde diethyl acetal, 2-(4-bromophenyl)oxirane, 2-(4-chlorophenyl)oxirane, 2-(4-fluorophenyl)oxirane, 9-oxabicyclo[6.1.0]non-4-ene, cyclooctene oxide, tert-butyl N-(2-oxiranylmethyl)carbamate, 3,4-epoxy-2-phenyl-1,1,1-trifluoro-2-butanol, 1,2-epoxy-9-decene, cyclodecene oxide, stilbene oxide, 1,2-epoxycyclododecane, 1,3-butadiene diepoxide, dicyclopentadiene dioxide, vinylcyclohexene dioxide, and 2-(3,4-epoxycyclohexyl)ethyltriethoxysilane. One of skill in the art will appreciate that one or more of the epoxy monomeric diluents above also include, or may be modified to include, one or more alkene, hydroxyl, carboxylic acid, amine, amide, imine, isocyanate, anhydride, or acrylate functional groups.

In some instances, suitable alkenes may include, but are not limited to isoprene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, 2-bromoacrolein, allyl chloride, allyl bromide, allyl iodide, allyl alcohol, allylamine, 1,3-butadiene, 2,3-dimethyl-1,3-butadiene, 1,4-pentadiene, trans-1,3-pentadiene, 3-methyl-1,3-pentadiene, 3-methyl-1,4-pentadiene, 1,3-hexadiene, 1,4-hexadiene, 1,5-hexadiene, 2,4-hexadiene, 1,6-heptadiene, 1,7-octadiene, 1,8-nonadiene, 1,9-decadiene, 1,13-tetradecadiene, cyclopentene, 1-hydroxymethyl-3-cyclopentene, methylenecylcobutane, methylenecyclopropane, allylcyclopentane, methylenecyclohexane, allylcyclohexane, vinylcyclooctane, cyclohexene, 4-methylcyclohexene, cycloheptene, cyclooctene, 3-cyclohexene-1-methanol, 2-cyclohexen-1-ol, 1,3-cyclohexadiene, 1,4-cyclohexadiene, 1,3-cycloheptadiene, 1,3-cyclooctadiene, 1,5-cyclooctadiene, cis-4-cyclopentene-1,3-diol, 2-methyl-1-butene, 2-methyl-2-butene, 3-methyl-1-butene, 3-bromo-2-bromomethyl-1-propene, 3-aminocrotononitrile, crotyl bromide, crotyl iodide, crotyl alcohol, 3-iodo-2-methylpropene, 1-(dimethylamino)-2-nitroethylene, 2-Methyl-2-propen-1-ol, 3-buten-1-ol, 2-methyl-3-buten-1-ol, 2-methyl-3-buten-2-ol, 3-methyl-2-buten-1-ol, 3-methyl-3-buten-1-ol, 2-penten-1-ol, 1-penten-3-ol, 3-penten-2-ol, 4-penten-1-ol, 4-penten-2-ol, 1,4-pentadien-3-ol, 1,5-hexadien-3-ol, 3,4-dihydroxy-1-butene, cis-2-butene-1,4-diol, 2-methylallylamine, 3-butenylamine, N-allylmethylamine, diallylamine, diallylmethylamine, N-allylcyclopentylamine, N-allylaniline, triallylamine, N-tert-butyl-1,1-dimethylallylamine, N-tert-amyl-1,1-dimethylallylamine, 1,1-dichloro-2-vinylcyclopropane, vinyl acrylate, 3-ethoxy-acryloyl chloride, 3-(allyloxy)-1-propyne, 5-hexen-2-yn-1-ol, 6-iodo-1-hexene, 2,3-dimethyl-1-butene, 2,3-dimethyl-2-butene, 3,3-dimethyl-1-butene, 2-ethyl-1-butene, 3-methyl-1-pentene, 3-methyl-2-pentene, 4-methyl-1-pentene, 4-methyl-2-pentene, 1-butenyl ethyl ether, 1-hexen-3-ol, 4-hexen-1-ol, 3-methyl-1-penten-3-ol, 4-methyl-3-penten-1-ol, 3-hexene-1, 6-diol, 6-hepten-3-yn-1-ol, 2,4-dimethyl-1,3-pentadiene, 2-methyl-1,5-hexadiene, 1,6-heptadien-4-ol, 2,3,3-trimethyl-1-butene, 2-methyl-1-hexene, 3-ethyl-2-pentene, 4,4-dimethyl-1-pentene, 4-methyl-1-hexene, 5-methyl-1-hexene, 3-methyl-5-hexen- 3-ol, 2-methyl-6-hepten-3-yn-2-ol, 7-octenoic acid, 8-nonenoic acid, 2,4,4-trimethyl-1-pentene, 2-ethyl-1-hexene, 2-methyl-1-heptene, diisobutylene, 1-octen-3-ol, 1-allyl-4-fluorobenzene, 1-allyl-4-(trifluoromethyl)benzene, 1,1,1-trifluoro-2-phenyl-3-buten-2-ol, styrene, 2-methylstyrene, allylbenzene, 2-vinylanisole, 3-vinylanisole, α-vinylbenzyl alcohol, trans-1-phenyl-1,3-butadiene, 1-(2-chlorophenyl)-3-buten-1-ol, 1-allyl-2-methylbenzene, 1-allyl-3-methylbenzene, 4-allyltoluene, 4-phenyl-1-butene, 2-allylanisole, 4-allyylanisole, 4-phenyl-1-buten-4-ol, 5-ethylidene-2-norbornene, 5-vinyl-2-norbornene, dipentene, myrcene, linalool, 2-methyl-1-nonene, 3,7-dimethyl-1-octene, 9-decen-1-ol, dihydromyrcenol, 1-(4-methylphenyl)-3-buten-1-ol, 1-(2-methoxyphenyl)-3-buten-1-ol, 4-allyl-1,2-dimethoxybenzene, 3,9-divinyl-2,4,8,10-tetraoxaspiro[5.5]undecane, 10-undecen-1-ol, 2-methyl-1-undecene, 1,1-diphenylethylene, nerolidol, geranyllinalool, isophytol, vinyloxytrimethylsilane, allyloxytrimethylsilane, allyloxy-tert-butyldimethylsilane, 2,3-bis(trimethylsilyl)-1-propene, tris(2-methoxyethoxy)(vinyl)silane, and tris(trimethylsiloxy)(vinyl)silane. One of skill in the art will appreciate that one or more of the alkene monomeric diluents above also include, or may be modified to include, one or more epoxy, hydroxyl, carboxylic acid, amine, amide, imine, isocyanate, anhydride or acrylate functional groups.

In some instances, suitable hydroxyls include, but are not limited to, ethanol, propanol, isopropanol, butanol, isobutanol, tert-butanol, sec-butanol, pentanol, hexanol, heptanol octanol, phenol, benzyl alcohol, isoamyl alcohol, allyl alcohol, cetyl alcohol, lauryl alcohol, capric alcohol, nonanol, undecanol, myristyl alcohol, palmitoleyl alcohol, eicosanol, hexacosanol, 1-docosanol, elaidyl alcohol, 1-tetracosanol, petroselinyl alcohol, propgaryl alcohol, cinnamyl alcohol, vanillyl alcohol, furfuryl alcohol, diacetone alcohol, oleyl alcohol, stearyl alcohol, phenylethyl alcohol, tetrahydrofurfuryl alcohol, α-cyclocropylbenzyl alcohol, t-amyl alcohol, conferyl alcohol, piperonyl alcohol, anisyl alcohol, 4-methoxybenzyl alcohol, 3-methoxybenzyl alcohol, 2-methoxybenzyl alcohol, 2-hydroxyphenethyl alcohol, 4-methylbenzyl alcohol, 3-methylbenzyl alcohol, 2-methylbenzyl alcohol, α-methylbenzyl alcohol, p-coumaroyl alcohol, α-vinylbenzyl alcohol, sinapyl alcohol, 4-ethynylbenzyl alcohol, 4-isopropylbenzyl alcohol, β-ethylphenethyl alcohol, α-ethylphenethyl alcohol, 2,4-dimethylphenethyl alcohol, 4-hydroxybenzyl alcohol, 3-hydroxybenzyl alcohol, 2-hydroxybenzyl alcohol, 4-acetoxybenzyl alcohol, caffeoyl alcohol, p-mentha-1,8-diene-7-ol, 4-nitrophenethyl alcohol, 3-nitrophenethyl alcohol, 2-nitrophenethyl alcohol, vanillyl alcohol, 3,5-dimethylbenzyl alcohol, 3,4-dimethylbenzyl alcohol, homovanillyl alcohol, 4-methylphenethyl alcohol, 3-methylphenethyl alcohol, 2-methylphenethyl alcohol, 3-hydroxy-4-methoxybenzyl alcohol, 4-ethylbenzyl alcohol, 2-ethylbenzyl alcohol, 2-ethoxybenzyl alcohol, 3-ethoxybenzyl alcohol, 4-aminophenethyl alcohol, 2-aminophenethyl alcohol, 4-aminobenzyl alcohol, 4-methoxyphenethyl alcohol, 3-methoxyphenethyl alcohol, 2-methoxyphenethyl alcohol, 4-nitrobenzyl alcohol, 3-nitrobenzyl alcohol, 2-nitrobenzyl alcohol, 3-aminobenzyl alcohol, 2-aminobenzyl alcohol, 3,4-dimethoxybenzyl alcohol, 2,5-dimethoxybenzyl alcohol, 3,5-dimethoxybenzyl alcohol, 2,4-dimethoxybenzyl alcohol, 2,3-dimethoxybenzyl alcohol, 4-tert-butylbenzyl alcohol, 4-butylbenzyl alcohol, 3-benzyloxybenzyl alcohol, 4-benzyloxybenzyl alcohol, 4-phenoxybenzyl alcohol, 4-pentyloxybenzyl alcohol, α-isobutylphenethyl alcohol, 4-tert-butylphenethyl alcohol, 4-bromobenzyl alcohol, 3-bromobenzyl alcohol, 2-bromobenzyl alcohol, 2-bromoallyl alcohol, 4-chlorophenethyl alcohol, 3-chlorophenethyl alcohol, 2-chlorophenethyl alcohol, 4-bromophenethyl alcohol, 3-bromophenethyl alcohol, 2-bromophenethyl alcohol, 3,4,5-trimethoxybenzyl alcohol, 2,3,4-trimethoxybenzyl alcohol, 2,4,5-trimethoxybenzyl alcohol, 4-chlorobenzyl alcohol, 3-chlorobenzyl alcohol, 2-chlorobenzyl alcohol, α-[2-(methylamino)ethyl]benzyl alcohol, 3,5-dihydroxybenzyl alcohol, 4-fluorophenethyl alcohol, 3-fluorophenethyl alcohol, 2-fluorophenethyl alcohol, 4-fluorobenzyl alcohol, 3-fluorobenzyl alcohol, 2-fluorobenzyl alcohol, 4-iodophenethyl alcohol, 3-iodophenethyl alcohol, 2-iodophenethyl alcohol, 4-iodobenzyl alcohol, 3-iodobenzyl alcohol, 2-iodobenzyl alcohol, 2,4,5-trifluorobenzyl alcohol, 2,3,4-trifluorobenzyl alcohol, 2,3,5-trifluorobenzyl alcohol, 2,3,6-trifluorobenzyl alcohol, batyl alcohol, 1,12-octadecanediol, 2,5-diethoxybenzyl alcohol, 2,6-diethoxybenzyl alcohol, 3,4-diethoxybenzyl alcohol, 3,5-diethoxybenzyl alcohol, nonafluoro-tert-butyl alcohol, 3-(trimethylsilyl)propargyl alcohol, 6,9,12-octadecatrienol, 2,3,4,5,6-pentabromobenzyl alcohol, 2,3,4,5,6-pentaflurobenzyl alcohol, α-(methylaminomethyl)benzyl alcohol, 4-amino-3-methylbenzyl alcohol, 4-(methylsulfonyl) benzyl alcohol, 4-(methylthio)benzyl alcohol, 4-(trifluoromethyl)phenethyl alcohol, 3-(trifluoromethyl) phenethyl alcohol, 2-(trifluoromethyl)phenethyl alcohol, 4-(trifluoromethyl)benzyl alcohol, 3-(trifluoromethyl)benzyl alcohol, 2-(trifluoromethyl)benzyl alcohol, 1,2-benzenedimethanol, diphenylmethanol, triphenylmethanol, 4-penten-1-ol, 3-methyl-2-buten-1-ol, cyclohexanemethanol, dexpanthenol, 3,3-dimethyl-2-butanol, 2-ethyl-1-butanol, 2-phenyl-1-propanol, 1-phenyl-1-propanol, 3-phenyl-1-propanol, 1-(p-tolyl)ethanol, 2-amino-1-phenylethanol, 2-ethyl-1-hexanol, 2-octanol, 2,2,2-trichloroethanol, 2,2,2-trifluoroethanol, 2,2,2-tribromoethanol, 2-thiophenemethanol, 3-pentanol, 2-pentanol, propanolamine, 2-amino-2-methyl-1-propanol, 4-(1-hydroxyethyl)aniline, 3-amino-1-propanol, 3-cyclohexene-1-methanol, DL-3,4-dihydroxyphenyl glycol, 5-amino-2,2-dimethylpentanol, xylitol, nerol, 3-buten-2-ol, 4-methyl-2-pentanol, geraniol, phenoxyethanol, hydroxyacetone, cyclobutanol, cyclopentanemethanol, 2-dimethylaminoethanol, N-methyldiethanolamine, salicylic acid, 5-hexyn-1-ol, 3-butyn-1-ol, and 1,4-dihydroxynaphthalene. One of skill in the art will appreciate that one or more of the hydroxyl monomeric diluents above also include, or may be modified to include, one or more epoxy, alkene, carboxylic acid, amine, amide, imine, isocyanate, anhydride or acrylate functional groups.

In some instances, suitable carboxylic acids include, but are not limited to, acetic acid, butyric acid, isobutyric acid, propionic acid, pentanoic acid, hexanoic acid, heptanoic acid, $C_8$-$C_{26}$ saturated or unsaturated fatty acids, malonic acid, benzoic acid, citric acid, salicylic acid, lactic acid, acetylsalicylic acid, oxalic acid, tartaric acid, acrylic acid, succinic acid, glutamic acid, glutaric acid, gallic acid, maleic acid, malic acid, folic acid, adipic acid, phenylacetic acid, methacrylic acid, retinoic acid, cinnamic acid, aspartic acid, fumaric acid, nicotinic acid, caffeic acid, anthranilic acid, ferulic acid, mandelic acid, valproic acid, pyruvic acid, glycolic acid, edetic acid, ethylenediamintetraacetic acid, thioglycolic acid, phenylsuccinic acid, chloroacetic acid, dichloroacetic acid, terephthalic acid, phthalic acid, hippuric acid, sorbic acid, 2,4-hexadecanoic acid, vanillic acid, pivalic acid, isovaleric acid, p-aminobenzoic acid, levulinic acid, crotonic acid, itaconic acid, protocatechuic acid, sebacic acid, propiolic acid, iodoacetic acid, azelaic acid, benzilic acid, kynurenic acid, nitrilotriacetic acid, sinapic acid, cyanoacetic acid, aminocaproic acid, isonicotinic acid, trimesic acid, orotic acid, suberic acid, 3-phenylpropionic acid, hydrocinnamic acid, pimelic acid, homovanillic acid, iminodiacetic acid, cyclopropanecarboxylic acid, pyroglutamic acid, syringic acid, phenoxyacetic acid, trans-2,3-dimethacrylic acid, perfluorobutanoic acid, thioctic acid, perfluorooctanoic acid, heptafluorobutyric acid, ricinoleic acid, mercaptosuccinic acid, cyclobutanecarboxylic acid, pentetic acid, shikimic acid, flufenamic acid, cyclohexanecarboxylic acid, methylmalonic acid, 4-pentenoic acid, 3,3-dimethacrylic acid, trans-2-pentenoic acid, 2-ethylacrylic acid, 3-pentenoic acid, phenylpyruvic acid, cyclopentanecarboxylic acid, 3-butenoic acid, oxaloacetic acid, p-toluic acid, o-toluic acid, m-toluic acid, 2-methylpentanoic acid, 4-methylpentanoic acid, 2-ethylbutyric acid, 3-methylpentanoic acid, 2,2-dimethylbutyric acid, 2-methylvaleric acid, 3-methylvaleric acid, methoxyacetic acid, mefenamic acid, valerenic acid, 2-ketobutyric acid, acetylenedicarboxylic acid, 4-methoxybenzoic acid, 3-methoxy benzoic acid, 2-methoxtbenzoic acid, 3-hydroxyphenylacetic acid, 3-hydroxy-4-methylbenzoic acid, 4-hydroxy-2-methylbenzoic acid, 4-hydroxy-3-methylbenzoic acid, ibotenic acid, ethylmalonic acid, 5-hexenoic acid, 2-propylacrylic acid, diglycolic acid, tropic acid aminosalicylic acid, piperonylic acid, pteroic acid, 4-ethylbezoic acid, 2-phenylpropionic acid, benzyloxyacetic acid, chelidamic acid, 4-pyridineacetic acid, 5-methylpicolinic acid, 6-methylnicotinic acid, 4-acetylbutryic acid, fluoroacetic acid, quinaldic acid, phenylpropiolic acid, ethacrynic acid, citronellic acid, 4-phenylbutyric acid, 2-phenylbutyric acid, 3-phenylbutyric acid, 2-aminoisobutyric acid, 3-aminobutanoic acid, 2-allylbenzoic acid, 2-benzylacrylic acid, and indan-2-carboxylic acid. One of skill in the art will appreciate that one or more of the carboxylic acid monomeric diluents above also include, or may be modified to include, one or more epoxy, alkene, hydroxyl, amine, amide, imine, isocyanate, anhydride or acrylate functional groups.

In some instances, suitable amines include primary amines such as, but not limited to, $C_3$-$C_{24}$ linear, branched or cyclic alkyl amines, $C_3$-$C_{24}$ linear, branched or cyclic alkenyl amines, $C_3$-$C_{24}$ linear, branched, or cyclic alkynyl amines, allyl amine, (3-methylpentyl)amine, 4-pentyn-1-amine, 2-ethylcyclopropan-1-amine, 3-buten-1-amine, (1-cyclopropylpropyl)amine, 2-(1-cyclohexenyl)ethylamine, 2-(2-pyridyl)ethylamine, 1-(1-naphthyeethylamine, 2-(ethylthio)ethylamine, 2-cyclohexyl-ethylamine, 1-cyclopropyl-ethylamine, 4-aminophenyl propargyl ether, 1,2,4,5-benzenetetramine, tetrahydro-2H-pyran-3-amine, (2-cycloheptylethyl)amine, (3-cyclopentylpropyl)amine, aniline, 4,4'-(1,1'-biphenyl-4,4'-diyldioxy)dianiline, 3,4-(methylenedioxy)aniline, N-(2-hydroxyethyl)aniline, 4-(trifluoromethyl)aniline, 4-(methylthio)aniline, 3-(methylthio)aniline, 3,5-bis(trifluoromethyl)aniline, 4-chloro-3-(trifluoromethyl) aniline, 4-(4-chlorophenoxy)aniline, 4-(vinyloxy)aniline, 4-(2-aminoethyl)aniline, 3-(1-aminoethyl)aniline, 3-(tert-butyl)aniline, 4-(1-hydroxyethyl)aniline, 4-(4-pyridylmethyl)aniline, 4-(2-phenylethylenyl)aniline, 2-(2-methoxyethoxy)aniline, 2-(phenoxymethyl)aniline, 4-(2-methoxyethoxy)aniline, 4-(2-methylphenoxy)aniline, 4-(4-methylphenoxy)aniline, 4-(phenoxymethyl)aniline, N-aminopropyl aniline, 3-(2-furyl)aniline, 4-(4-butylphenyl)aniline, 4-(2,3-dimethylphenoxy)aniline, 4-(2-methoxyphenoxy)aniline, 4-(trifluoromethoxy)aniline, 3-(trifluoromethoxy)aniline, 4-(hexyloxy)aniline, 4-(octyloxy) aniline, 4-(difluoromethoxy)aniline, 3-(difluoromethoxy) aniline, 4-(trifluoromethylthio)aniline, 4-(4-fluorophenoxy) aniline, 4-(4-bromophenoxy)aniline, 2-(2-furylmethoxy) aniline, 3-(2-thienyl)aniline, 3-(2-quinoxalinyl)aniline, 3-(difluoromethyl)aniline, 3-(methylsulfonyl)aniline, 3-(morpholinosulfonyl)aniline, 3-(piperidinosulfonyl)aniline, 4-(1-axepanylmethyl)aniline, 4-(2,2,2,-trifluoroethoxy) aniline, 4-(2-chlorophenoxy)aniline, 4-(2-pyrimidinyloxy) aniline, 4-(2-thienylmethoxy)aniline, 4-(3,4-dichlorophenoxy)aniline, 4-(3-chlorophenoxy)aniline, 4-(4-benzylpiperazino)aniline, 4-(4-nitrophenoxy)aniline, 4-(morpholinomethyl)aniline, m-β-hydroxyethylsulfonyl aniline, 2-(2-aminoethyl)aniline, 3-(1H-pyrrol-1-yl)aniline, 2-[2-(2-pyridinyl)ethyl]aniline, 4-(tetrahydrofuran-2-ylmethoxy)aniline, 2-(1H-1,2,4-Triazol-1-ylmethyl)aniline, 3-(1,3-oxazol-5-yl)aniline, 1,5-naphthyridin-4-amine, 1,5-naphthyridin-3-amine, 1,6-naphthyridin-2-amine, 1,7-naphthyridin-8-amine, 1,8-naphthyridin-3-amine, 4-(1,3-oxazol-5-yl)aniline, 4-[(dimethylamino)methyl]aniline, 4-[4-(2-methylpropyl)phenyl]aniline, 4-[4-(butan-2-yl)phenyl] aniline, 4-(1H-imidazol-1-yl)aniline, 2-(pyridin-3-yloxy) aniline, 1,3-benzoxazol-6-amine, 1,3-benzoxazol-5-amine, 4-methyl-3-(trifluoromethyl)aniline, 2-piperidin-1-ylmethyl-aniline, 3-(4-Methylpiperidin-1-yl)aniline, 3-(piperidin-1-ylmethyl)aniline, 3-aminocrotonitrile, m-phenylenediamine, 3-methylbenzylamine, 3'-aminoacetanilide, 4-morpholinoaniline, methyl 4-aminobenzoate, ethyl 3-aminobenzoate, ethyl 4-aminobenzoate, 4-aminophenyl alcohol, butamben, N,N-dienthyl-p-phenylenediamine, 4'-aminoacetanilide, 3'-aminoacetanilide, o-chloroaniline, o-bromoaniline, o-fluoroaniline, m-chloroaniline, m-bromoaniline, m-fluoroaniline, p-chloroaniline, p-bromoaniline, p-fluoroaniline 4,4'-dioxyaniline, 4,4'-ethylenedianiline, 4,4'-diaminophenylmethane, 4-aminobuphenyl, 4-butoxyaniline, 4-phenoxyaniline, 3-phenoxyaniline, 4-ethylaniline, 4-isopropylaniline, 4-propylaniline, 4-nitroaniline, 3-nitroaniline, 4-aminobenzonitrile, p-anisidine, p-toluidine, sulfanilamide, 4-(1-methylheptyl)aniline, 3- or 4-(heptyloxy)aniline, 3- or 4-(hexadecyloxy)aniline, 3- or 4-(octadecyloxy)aniline, 3- or 4-(tetradecyloxy)aniline, 2-(allylsulfanyl)aniline, 2-(vinylsulfanyl)aniline, N-phenylethylenediamine, N-phenyl-1-naphthylamine, N-phenyl-2-naphthylamine, 3-(dimethylamino)-1-propylamine, 1,2,3,4-tetrahydroisoquinolin-7-amine, 1H-indol-3-amine, 3-cyclopropyl-1H-pyrazol-5-amine, 4H-1,2,4-triazol-3-amine, (1H-indol-2-ylmethyl) amine, bis(3-aminopropyl)amine, 1H-indazol-4-amine, 1H-indazol-3-amine, 1H-pyrrolo[2,3-b]pyridin-4-amine, 1H-pyrrolo[2,3-b]pyridin-6-amine, 1H-pyrrolo[2,3-b]pyridin-5-amine, imidazo[1,2-a]pyridin-5-amine, 1-(1-naphthyl)-3-buten-1-amine, 1-(1H-pyrazol-1-yl)propan-2-amine, and 1H-pyrrol-1-amine. One of skill in the art will appreciate that one or more of the primary amine monomeric diluents above also include, or may be modified to include, one or more epoxy, alkene, hydroxyl, carboxylic acid, secondary amine, amide, imine, isocyanate, anhydride or acrylate functional groups.

In some instances, suitable amines include secondary amines such as, but not limited to, pyrrole, aziridine, azetidine, indole, morpholine, piperidine, pyrrolidine, histidine, tetrazole, imidazole, pyrazole, pentazole, 1,2,3-traizole, 1,2,4-triazole, dipropylamine, dibutylamine, diisobutylamine, dihexylamine, N-ethylbutylamine, 2-ethyl-N-butylamine, N-ethyl-N-propylamine, di-n-butylethylamine, N-methylpropylamine, N-methyldodecylamine, N-methyloctadecylamine, N-methyloctylamine, N-heptylmethylamine, N-hexylmethylamine, dioctadecylamine, didocecylamine, didecylamine, (cyclopropylmethyl)ethylamine, cyclohexylprop-2-ynyl-amine, hydrabenzene, N-cyclohexylaniline, N-benzylaniline, N-methyl-4-nitroaniline, N-ethylaniline, N-methyl-m-toluidine, (2,2-dimethylpropyl)(methyl)amine, cyclohex-3-enylmethyl-(2-morpholin-4-yl-ethyl)-amine, N-(sec-butyl)-N-(2-phenylethyl)amine, N-methyl-N-(1- phenylethyl)amine, methyl-(3-phenoxy-phenyl)-amine, di-(2-picolyl)amine, cyclopentylmethylamine, N-methyl-N-(4-methylbenzyl)amine, N-benzylprop-2-en-1-amine, indan-1-yl-methyl-amine, phenyl-prop-2-ynyl-amine, butyl-but-2-ynyl-amine, (1H-imidazol-2-ylmethyl)-isopropyl-amine, 1-(4-methoxyphenyl)-N-methylpropan-1-amine, N-benzyl-N-(2-methoxyethyl)amine, methyl-(5-methyl-1H-indol-3-ylmethyl)-amine, ethyl-(1-methyl-1H-imidazol-2-ylmethyl)-amine, methyl-morpholin-2-ylmethyl-amine, methyl-(tetrahydro-pyran-2-ylmethyl)-amine, methyl-(tetrahydro-pyran-4-ylmethyl)-amine, cyclopentyl-furan-2-ylmethyl-amine, isopropyl-(tetrahydro-furan-2-ylmethyl)-amine, N-methyl-N-(4-pyridin-2-ylbenzyl)amine, N-methyl-N-(3-pyridin-4-ylbenzyl)amine, N-methyl-N-(4-pyridin-4-ylbenzyl)amine, (dicyclopropylmethyl)(methyl)amine, N-(pyridin-3-ylmethyl)propan-2-amine, N-phenylhydroxylamine, N,N'-diphenylethylenediamine, 2-methyl-N-(2-methyl-2-propenyl)-2-propen-1-amine, bis(2-hydroxypropyl)amine, bis(2-methoxyethyl)amine, N-methyltetrahydro-2H-pyran-4-amine, 4-ethylnylaniline, diphenylamine, 3- or 4-bromo-diphenylamine, 4,4'-dimethoxydiphenylamine N-methylaniline, N-(alpha-allylbenzyl)aniline, N-ethyl-3,4-(methylenedioxy)aniline, N-(2-chloro-2-propenyl)aniline, N-(3-(phenylimino)propenyl)aniline, 2-[(benzylamino)methyl]aniline, 2-[(propylamino)methyl]aniline, N-(cyclohexylmethyl)aniline, N-(tert-butyl)-4-(methylthio)aniline, N-ethyl-4-(trifluoromethoxy)aniline, N-ethyl-2-(trifluoromethoxy)aniline, N-methyl-4-(trifluoromethoxy)aniline, N,N-dimethyl-4-([(4-methylphenyl)amino]methyl)aniline, 4-chloro-N-(2,3-dimethylbutan-2-yl)aniline, 4-chloro-N-(tert-pentyl)aniline, 4-fluoro-N-(2,4,4-trimethylpentan-2-yl)aniline, 4-fluoro-N-(2-methylpentan-2-yl)aniline, 4-fluoro-N-(3-pyridinylmethyl)aniline, 4-fluoro-N-(tert-pentyl)aniline, 4-methoxy-N-(2,4,4-trimethyl pentan-2-yl)aniline, 4-methoxy-N-(tert-pentyl)aniline, 4-(N-acetyl)-N-(2-methylpentan-2-yl)aniline, 4-(N-acetyl)-N-(tert-pentyl)aniline, 3-methyl-N-(2-methylpentan-2-yl)aniline, N,N'-dimethyl-1,3-propanediamine, N,N'-diethyl-2-butene-1,4-diamine, N,N'-diisopropylethylenediamine, N,N'-diethyl-2-butene-1,4-diamine, and N,N'-diisopropyl-1,3-propanediamine. One of skill in the art will appreciate that one or more of the secondary amine monomeric diluents above also include, or may be modified to include, one or more epoxy, alkene, hydroxyl, carboxylic acid, primary amine, amide, imine, isocyanate, anhydride or acrylate functional groups.

In some instances, suitable amides include, but are not limited to, formamide, niacinamide, acetamide, octadecanamide, butyramide, behenamide, acrylamide, oleamide, 1,2,4,5-benzenetetracarboxamide, 2,2-diethoxyacetamide, benzamide, glutamine, carbamylurea, pyrazinamide, antranilamide, isonicotinamide, DL-lactamide, pentanamide, propiolamide, linoleamide, benzanilide, tert-butyl carbamate, 9-fluorenylmethyl carbamate, 3-amino-4-chlorobenzamide, 2-chloro-N-phenylacetamide, 2,2-dibromo-2-cyanoacetamide, acetoacetanilide, acetanilide, formanilide, DL-norleucine amide, L-asparagine, N-acetylcysteine amide, 4-methoxy-pyridine-2-carboxylic acid amide, 6-methoxy-pyridine-2-carboxylic acid amide, 3-cyclohexyl-L-alanine amide, 2-amino-thiophene-3-carboxylic acid amide, oxalic acid mono-(N-methyl)-amide, 1-benzyl-pyrrolidine-3-carboxylic acid amide, 2-bromo-5-chloropyridine-6-amide, 3-bromo-4,5-dihydroisoxazole-5-carboxylic acid amide, 4-amino-1-methyl-1H-pyrazole-3-carboxylic acid amide, 4-chloropyridine-2-carboxylic acid amide, 6-chloropyridine-2-carboxylic acid amide, 1-(3-amino-propyl)-piperidine-4-carboxylic acid amide, 2-(piperazin-1-yl)-acetic acid N-(2-phenylethyl)-amide, and 2-(piperazin-1-yl)-acetic acid N-(2-pyridyl)-amide. One of skill in the art will appreciate that one or more of the amide monomeric diluents above also include, or may be modified to include, one or more epoxy, alkene, hydroxyl, carboxylic acid, amide, imine, isocyanate, anhydride or acrylate functional groups.

In some instances, suitable imines include, but are not limited to be, primary or secondary aldimines, primary or secondary ketimines, amidines, cyclic imines and acyclic imines. Specific examples of suitable imines include, but are not limited to, formamidine, acetamidine, 2-aminoacetamidine, chloroacetamidine, benzamidine, benzothiazole, N-benzylideneaniline, benzophenone imine, N-benzylidenemethylamine, N-benzylideneethylamine, 2,2,4,4-tetramethyl-3-pentanone imine, auramine, 2-methyl-1-pyrroline, and N-butyl-2-pyridylmethanimine. One of skill in the art will appreciate that one or more of the imine monomeric diluents above also include, or may be modified to include, one or more epoxy, alkene, hydroxyl, carboxylic acid, amine, amide, isocyanate, anhydride or acrylate functional groups.

In some instances, suitable isocyanates include, but are not limited to, ethyl isocyanate, 2-bromoethyl isocyanate, 2-chloroethyl isocyanate, allyl isocyanate, propyl isocyanate, isopropyl isocyanate, 3-chloropropyl isocyanate, butyl isocyanate, tert-butyl isocyanate, pentyl isocyanate, hexyl isocyanate, heptyl isocyanate, decyl isocyanate, undecyl isocyanate, octadecyl isocyanate, hexadecyl isocyanate, tetradecyl isocyanate, dodecyl isocyanate, cyclohexanemethyl isocyanate, benzyl isocyanate, isocyanatocyclobutane, cyclopentyl isocyanate, cycloheptyl isocyanate, cyclohexyl isocyanate, hexamethylene diisocyanate, 3,3-diphenylpropyl isocyanate, 2-(4-biphenyl)ethyl isocyanate, butyl isocyanatoacetate, ethyl 4-isocyanatobutyrate, 2-isocyanatoethyl methacrylate, 2,2-diphenylethyl isocyanate, 4-(benzyloxy)phenyl isocyanate, diphenylmethyl isocyanate, 4-benzylphenyl isocyanate, 2-benzylphenyl isocyanate, 4-isocyanatobenzophenone, 9H-fluoren-9-yl isocyanate, 9H-fluoren-2-yl isocyanate, p-phenylazophenyl isocyanate, 4-phenoxyphenyl isocyanate, 3-phenoxyphenyl isocyanate, 4-biphenylyl isocyanate, 4-pentylphenyl isocyanate, 3,4,5-trimethoxybenzyl isocyanate, 3,4-dimethoxyphenethyl isocyanate, 2,3-dimethoxyphenethyl isocyanate, 4-tert-butylphenyl isocyanate, 4-phenylbutyl isocyanate, 4-ethylphenethyl isocyanate, ethyl (4-isocyanatophenyl)acetate, 1-isocyanato-1,2,3,4-tetrahydronaphthalene, 2-naphthyl isocyanate, 1-naphthyl isocyanate, 3-phenylpropyl isocyanate, 3,4-methylenedioxyphenethyl isocyanate, 5-indanyl isocyanate, 2-ethylhexyl isocyanate, 4-(dimethylamino)phenyl isocyanate, 3,5-dimethoxyphenyl isocyanate, 3,4-dimethoxyphenyl isocyanate, 2,5-dimethoxyphenyl isocyanate, 2,4-dimethoxyphenyl isocyanate, 4-methoxybenzyl isocyanate, 3-methoxybenzyl isocyanate, 2-methoxybenzyl isocyanate, 3-ethoxyphenyl isocyanate, phenethyl isocyanate, 4-methylbenzyl isocyanate, 3-methylbenzyl isocyanate, 2-methylbenzyl isocyanate, 4-ethylphenyl isocyanate, 4-fluorophenethyl isocyanate, 2-fluorophenethyl isocyanate, 3-chlorophenethyl isocyanate, methyl 3-isocyanatobenzoate, 4-acetylphenyl isocyanate, 3,4-dichlorophenethyl isocyanate, 2,4-dichlorophenethyl isocyanate, 3,5-bis(trifluoromethyl)phenyl isocyanate, 4-methoxyphenyl isocyanate, 3-methoxyphenyl isocyanate, 2-methoxyphenyl isocyanate, p-tolyl isocyanate, o-tolyl isocyanate, m-tolyl isocyanate, 4-fluorobenzyl isocyanate, 3-fluorobenzyl isocyanate, 2-fluorobenzyl isocyanate, 4-chlorobenzyl isocyanate, 3-chlorobenzyl isocyanate, 2-chlorobenzyl isocyanate, 4-bromobenzyl isocyanate, 3-bromobenzyl isocyanate, 2-bromobenzyl isocyanate, 4-iodobenzyl isocyanate, 3-iodobenzyl isocyanate, 2-iodobenzyl isocyanate, 4-nitrobenzyl isocyanate, 3-nitrobenzyl isocyanate, 2-nitrobenzyl isocyanate, 4-(chloromethyl)phenyl isocyanate, 1,4-phenylene diisocyanate, 4-cyanophenyl isocyanate, 3-cyanophenyl isocyanate, 4-(trifluoromethyl)phenyl isocyanate, 3-(trifluoromethyl)phenyl isocyanate, 2-(trifluoromethyl)phenyl isocyanate, 4-isocyanatobenzoyl chloride, and 3-isocyanatobenzoyl chloride. One of skill in the art will appreciate that one or more of the isocyanate monomeric diluents above also include, or may be modified to include, one or more epoxy, alkene, hydroxyl, carboxylic acid, amine, amide, imine, anhydride or acrylate functional groups.

In some instances, suitable anhydrides include, but are not limited to, acetic anhydride, maleic anhydride, 1,8-naphthalic anhydride, succinic anhydride, phthalic anhydride, propionic anhydride, methacrylic anhydride, glutaric anhydride, citraconic anhydride, butyric anhydride, isatoic anhydride, 3,4,5,6-tetrahydrophthalic anhydride, diglycolic anhydride, itaconic anhydride, crotonic anhydride, trans-1,2-cyclohexanedicarboxylic anhydride, 2,3-dimethylmaleic anhydride, homophthalic anhydride, hexahydro-4-methylphthalic anhydride, 3,3-tetramethyleneglutaric anhydride, valeric anhydride, hexanoic anhydride, stearic anhydride, cis-aconitic anhydride, phenylsuccinic anhydride, methylsuccinic anhydride, 3,3-dimethylglutaric anhydride, 2,2-dimethylglutaric anhydride, palmitic anhydride, oleic anhydride, 3,4-pyridinedicarboxylic anhydride, bromomaleic anhydride, 4-methylphthalic anhydride, dodecanoic anhydride, 2-octen-1-ylsuccinic anhydride, diphenic anhydride, decanoic anhydride, myristic anhydride, 3-methylglutaric anhydride, phenylmaleic anhydride, 2-phenylglutaric anhydride, tetrachlorophthalic anhydride, tetrabromophthalic anhydride, 2,3-dichloromaleic anhydride, 2,3-pyrazinedicarboxylic anhydride, 4-nitrophthalic anhydride, 4,5-dichlorophthalic anhydride, 3,6-dichlorophthalic anhydride, 3,6-difluorophthalic anhydride, trifluoroacetic anhydride, benzoic anhydride, trimethylacetic anhydride, 1,2,4-benzenetricarboxylic anhydride, isobutyric anhydride, trichloroacetic anhydride, dichloroacetic anhydride, chloroacetic anhydride, heptafluorobutyric anhydride, pentafluoropropionic anhydride, iodoacetic anhydride, 4-pentenoic anhydride, butylsuccinic anhydride, phenoxyacetic anhydride, isovaleric anhydride, isonicotinic anhydride, 2-benzysuccinic anhydride, nonafluorobutanesulfonic anhydride, chlorodifluoroacetic anhydride, diphenylmaleic anhydride, tetrafluorosuccinic anhydride, cyclobutane-1,2,3,4-tetracarboxylic dianhydride, 4-bromobenzoic anhydride, 4-nitrobenzoic anhydride, benzoic (ethyl carbonic) anhydride, benzene-1,2,4,5-tetracarboxylic dianhydride, 1,4,5,8-naphthalenetetracarboxylic dianhydride, ethylenediaminetetraacetic dianhydride, bicyclo[2.2.2]oct-7-ene-2,3,5,6-tetracarboxylic dianhydride, 3,3',4,4'-biphenyltetracarboxylic dianhydride, diethylenetriaminepentaacetic dianhydride, benzophenone-3,3',4,4'-tetracarboxylic dianhydride, and 3,3',4,4'-biphenyltetracarboxylic dianhydride. One of skill in the art will appreciate that one or more of the anhydride monomeric diluents above also include, or may be modified to include, one or more epoxy, alkene, hydroxyl, carboxylic acid, amine, amide, imine, isocyanate or acrylate functional groups.

In some instances, suitable anhydrides include, but are not limited to, 4-acetoxyphenethyl acrylate, 6-acetylthiohexyl methacrylate, acryloyl chloride, 4-acryloylmorpholine, [2-(acryloyloxy)ethyl]trimethylammonium chloride, 2-(4-benzoyl-3-hydroxyphenoxy)ethyl acrylate, benzyl 2-propylacrylate, butyl acrylate, tert-butyl acrylate, 2-[[(butylamino)carbonyl]oxy]ethyl acrylate, tert-butyl 2-bromoacrylate, 2-carboxyethyl acrylate, 2-chloroethyl acrylate, 2-(diethylamino)ethyl acrylate, di(ethylene glycol) ethyl ether acrylate, 2-(dimethylamino)ethyl acrylate, ethyl acrylate, 2-ethylacryloyl chloride, ethyl 2-(bromomethyl) acrylate, ethylene glycol methyl ether acrylate, ethylene glycol dicyclopentenyl ether acrylate, ethylene glycol phenyl ether acrylate, ethyl 2-ethylacrylate, 2-ethylhexyl acrylate, ethyl 2-propylacrylate, hexyl acrylate, 4-hydroxybutyl acrylate, 2-hydroxyethyl acrylate, 2-hydroxy-3-phenoxypropyl acrylate, hydroxypropyl acrylate, isobutyl acrylate, isodecyl acrylate, isooctyl acrylate, lauryl acrylate, methyl 2-acetamidoacrylate, methyl acrylate, methyl α-bromoacrylate, methyl 2-(bromomethyl)acrylate, methyl 2-(chloromethyl)acrylate, methyl 3-hydroxy-2-methylenebutyrate, methyl 2-(trifluoromethyl)acrylate, octadecyl acrylate, pentabromobenzyl acrylate, pentafluorophenyl acrylate, N-propylacrylamide, tetrahydrofurfuryl acrylate, 2-tetrahydropyranyl acrylate, 3-(trimethoxysilyl)propyl acrylate, 3,5,5-trimethylhexyl acrylate, 10-Undecenyl acrylate, methyl methacrylate, butyl methacrylate, 2-(diethylamino)ethyl methacrylate, glycidyl methacrylate, ethyl methacrylate, benzyl methacrylate, lauryl methacrylate, allyl methacrylate, stearyl methacrylate, hydroxypropyl methacrylate, isobutyl methacrylate, phenyl methacrylate, 2-hydroxyethyl methacrylate, propgaryl methacrylate, vinyl methacrylate, furfuryl methacrylate, cyclohexyl methacrylate, propyl methacrylate, hexyl methacrylate, ethylene glycol methyl ether methacrylate, tert-butyl methacrylate, N-propyl methacrylate, sec-butyl methacrylate, tetrahydrofurfuryl methacrylate, hydroxybutyl methacrylate, 2-ethoxyethyl methacrylate, 2-ethylhexyl methacrylate, 2-naphthyl methacrylate, 1-naphthyl methacrylate, 2-(dimethylamino) ethyl methacrylate, solketal methacrylate, isodecyl methacrylate, 2-isocyanatoethyl methacrylate, sodium methacrylate, 3,3'-diethoxypropyl methacrylate, pentafluorophenyl methacrylate, 2-N-morpholinoethyl methacrylate, pentabromophenyl methacrylate, 2,2,2-trifluoroethyl methacrylate, 1,1,1,3,3,3-hexafluoroisopropyl methacrylate, 2,2,3,3,4,4,4-heptafluorobutyl methacrylate, (trimethylsilyl)methacrylate, pentafluorobenzyl methacrylate, pentabromobenzyl methacrylate, 2,2,3,4,4,4-hexafluorobutyl methacrylate, 2,2,3,3-hetrafluoropropyl methacrylate, di(ethylene glycol) methyl ether methacrylate, ethylene glycol phenyl ether methacrylate, 3-(trimethoxysilyl)propyl methacrylate, diethylene glycol butyl ether methacrylate, 2-(tert-butylamino)ethyl methacrylate, 3-(trichlorosilyl)propyl methacrylate, 3-(acryloyloxy)-2-hydroxypropyl methacrylate, 2-(diisopropylamino)ethyl methacrylate, 2-(trimethylsilyloxy)ethyl methacrylate, and 3-(dimethylchlorosilyl)propyl methacrylate. One of skill in the art will appreciate that one or more of the acrylate monomeric diluents above also include, or may be modified to include, one or more epoxy, alkene, hydroxyl, carboxylic acid, amine, amide, imine, isocyanate or anhydride functional groups.

In some instances, the function group of the monomeric diluent is the same as the functional group of the Polymer or oligomer.

Curing Agent

The curing agent of pastes generally includes an epoxy, an alkene, a hydroxyl, a carboxylic acid, an amine, an isocyanate, an imide, an aziridine, an amide, an organic imidazole, a melamine formaldehyde, an anhydride, an amine-Lewis acid adduct, a radical initiator, or any combination thereof.

In some instances, boron trifluoride ethylamine ($BF_3$: $C_2H_5NH_2$) is used as the curing agent.

Lubricating Compound

The lubricating compound of pastes generally includes a surfactant, an organosilicon or a combination thereof.

Preferred surfactants are those which contribute to the formation of a paste with favorable stability, printability, injectability, viscosity and sintering properties. Preferred surfactants are those based on linear chains, branched chains, aromatic chains, fluorinated chains, siloxane chains, polyether chains and combinations thereof. Preferred surfactants include, but are not limited to, single chained, double chained or poly chained polymers. Preferred surfactants may have non-ionic, anionic, cationic, amphiphilic, or zwitterionic heads. Preferred surfactants may be polymeric and monomeric or a mixture thereof. Preferred surfactants may have pigment affinic groups, preferably hydroxyfunctional carboxylic acid esters with pigment affinic groups (e.g., DISPERBYK®-108, manufactured by BYK USA, Inc.), polycarboxylic acid salt of polyamine amides (e.g., ANTI-TERRA® 204, manufactured by BYK USA, Inc.), acrylate copolymers with pigment affinic groups (e.g., DISPERBYK®-116, manufactured by BYK USA, Inc.), modified polyethers with pigment affinic groups (e.g., TEGO® DISPERS 655, manufactured by Evonik Tego Chemie GmbH), fatty alkyl amine (e.g., Duomeen® TDO, manufactured by AkzoNobel N.V.), or other surfactants with groups of high pigment affinity (e.g., TEGO® DISPERS 662 C, manufactured by Evonik Tego Chemie GmbH). Other preferred polymers not in the above list include, but are not limited to, polyethylene oxide, polyethylene glycol and its derivatives, and alkyl carboxylic acids and their derivatives or salts, or mixtures thereof. The preferred polyethylene glycol derivative is poly(ethyleneglycol)acetic acid. Preferred alkyl carboxylic acids are those with fully saturated and those with singly or poly unsaturated alkyl chains or mixtures thereof. Preferred carboxylic acids with saturated alkyl chains are those with alkyl chains lengths in a range from about 8 to about 20 carbon atoms, preferably $C_9H_{19}COOH$ (capric acid), $C_{11}H_{23}COOH$ (lauric acid), $C_{13}H_{27}COOH$ (myristic acid) $C_{15}H_{31}COOH$ (palmitic acid), $C_{17}H_{35}COOH$ (stearic acid), or salts or mixtures thereof. Preferred carboxylic acids with unsaturated alkyl chains are $C_{18}H_{34}O_2$ (oleic acid) and $C_{18}H_{32}O_2$ (linoleic acid). A preferred monomeric surfactant is benzotriazole and its derivatives.

Preferred organosilicons are those which contribute to the formation of a paste with favorable stability, printability, injectability, viscosity and sintering properties. Preferred organosilicons include, but are not limited to polydimethylsiloxanes (PDMS), polymethylhydrosiloxanes (PHMS), tetramethylcyclotetrasiloxane, hexamethylcyclotrisiloxane, octamethylcyclotetrasiloxane, decamethylcyclopentasiloxane, dodecamethylcyclohexasiloxane, octaethylcyclotetrasiloxane, hexaethylcyclotrisiloxane, decamethylcyclopentasiloxane, methacryloxypropyl-terminated polydimethylsiloxanes, trimethylsilyl-terminated polymethylhydrosiloxanes, phenylhydrocyclosiloxanes, methylhydrocyclosiloxanes, methylhydrosiloxane-dimethylsiloxane copolymers, trimethylsiloxane-terminated methylhydrosiloxane-dimethylsiloxane copolymers, monocarbinol-terminated polydimethylsiloxanes, monomethacryloxypropyl functional polydimethylsiloxanes, monovinyl functional polydimethylsiloxanes, polytrifluoromethylsiloxanes, monomethacryloxypropyl functional polytrifluoromethylsiloxanes, and silanol terminated polydimethylsiloxanes.

Ink/Paste Preparation

Solvent-free thick film ink or paste compositions may be formed by combining predetermined amounts of a conductive component, a polymer or oligomer, a monomeric diluent, a curing agent and, optionally, a lubricating compound. The amount and type of each component utilized may be determined by the final desired formulation viscosity, fineness of grind of the paste, the desired wet print thickness when to be applied on a substrate, and/or the desired injectability when to be applied within a via hole. In preparing compositions according to the disclosure, the components are mixed with suitable equipment, such as a three-roll mill, to form a uniform or substantially uniform suspension, resulting in a solvent-free thick film ink or paste for which the viscosity is in the range of about 40 to about 300 kcP (1 kcP=0.001 kcP·s), alternatively about 60 to about 250 kcP, alternatively about 70 to about 200 kcP, alternatively about 80 to about 150 kcP, alternatively about 85 to about 120 kcP, and alternatively about 90 to 110 kcP, at a shear rate of 9.6 $sec^{-1}$ as determined on a Brookfield viscometer HBT, spindle CP-51, measured at 25° C.

Methods of Making Electroconductive Lines/Contacts on Substrates

Electroconductive lines, patterns or contacts may be produced by applying any electroconductive ink or paste disclosed herein to a surface of a substrate. In some instances, an electroconductive ink or paste may be applied to a surface of a substrate by screen- or stencil printing. In other instances, an electroconductive ink or paste may be applied to a surface of a substrate by doctor-blading, dip-coating, spin-coating, inkjet printing, pneumatic spray printing, pad printing, dot matrix printing, laser printing, 3D printing, or any other suitable application technique. An electroconductive ink or paste may be applied to a surface of a substrate at a desired wet thickness such as, for example from about 5 to about 100 μm, alternatively from about 7.5 to about 80 μm, alternatively from about 10 to about 60 μm, alternatively from about 12.5 to about 40 μm, alternatively from about 15 to about 30 μm, and alternatively about 15 to about 25 μm. In some instances, automatic screen-printing techniques may be employed using a 200-400 mesh screen.

The electroconductive ink or paste is then cured to convert the ink or paste to a solid electroconductive line, pattern, contact, etc. In some instances, curing may take place at a temperature from about 100 to about 400° C. In other instances, curing may take place at a temperature from about 125 to about 375° C., alternatively from about 150 to about 350° C., alternatively from about 175 to about 325° C., and alternatively from about 200 to about 300° C. In some instances, curing may take place over a period of time ranging from about 5 minutes to about 2 hours. In some instances, curing may take place over a period of time ranging from about 10 to about 90 minutes, alternatively from about 15 to about 80 minutes, and alternatively from about 30 to about 60 minutes.

In some instances, curing may take place at more than one temperature over time. For example, in some instances, curing may take place at a first temperature for a first period of time followed by a second temperature for a second period of time. In accordance with the examples, the first temperature and first period of time is 200° C. and 10 minutes, and the second temperature and second period of time is 300° C. and 60 minutes. In some instances, the first temperature may range from about 100 to about 250° C. In some instances, the first period of time may range from about 5 minutes to about 30 minutes. In some instances, the second temperature may range from about 250 to about 400° C. In some instances, the second period of time may range from about 5 minutes to about 90 minutes. In some instances, curing may take place by a direct transition from the first temperature to the second temperature. In other instances, curing may take place by a ramped transition from the first temperature to the second temperature over a period of about 1 to about 20 minutes.

After curing, the substrate and electroconductive coating (line, pattern, contact, etc.) may be fired for as little as 1 second up to about 30 seconds at peak temperature, in a belt conveyor furnace in air. During firing, the conductive component within the electroconductive coating may be sintered.

Methods of Making Electroconductive Plugs within Via Holes of Substrates

An electroconductive plug may be produced by injecting or otherwise disposing any electroconductive ink or paste disclosed herein within a via hole of a substrate. In some instances, an electroconductive ink or paste may be disposed within a via hole by screen- or stencil-printing. In other instances, an electroconductive ink or paste may be applied to a surface of a substrate by doctor-blading, dip-coating, spin-coating, inkjet printing, pneumatic spray printing, pad printing, dot matrix printing, laser printing, 3D printing, or any other suitable application technique. An electroconductive ink or paste may be applied to a surface of a substrate at a desired wet thickness such as, for example from about 5 to about 100 micrometers (µm), alternatively from about 7.5 to about 80 µm, alternatively from about 10 to about 60 µm, alternatively from about 12.5 to about 40 µm, alternatively from about 15 to about 30 µm, and alternatively about 15 to about 25 µm. In some instances, automatic screen-printing techniques may be employed using a 200-400 mesh screen.

The electroconductive ink or paste located within the via hole is then cured to convert the ink or paste to a solid plug. In some instances, curing may take place at a temperature from about 100 to about 400° C. In other instances, curing may take place at a temperature from about 125 to about 375° C., alternatively from about 150 to about 350° C., alternatively from about 175 to about 325° C., and alternatively from about 200 to about 300° C. In some instances, curing may take place over a period of time ranging from about 5 minutes to about 2 hours. In some instances, curing may take place over a period of time ranging from about 10 to about 90 minutes, alternatively from about 15 to about 80 minutes, and alternatively from about 30 to about 60 minutes.

In some instances, curing may take place at more than one temperature over time. For example, in some instances, curing may take place at a first temperature for a first period of time followed by a second temperature for a second period of time. In accordance with the examples, the first temperature and first period of time is 200° C. and 10 minutes, and the second temperature and second period of time is 300° C. and 60 minutes. In some instances, the first temperature may range from about 100 to about 250° C. In some instances, the first period of time may range from about 5 minutes to about 30 minutes. In some instances, the second temperature may range from about 250 to about 400° C. In some instances, the second period of time may range from about 5 minutes to about 90 minutes. In some instances, curing may take place by a direct transition from the first temperature to the second temperature. In other instances, curing may take place by a ramped transition from the first temperature to the second temperature over a period of about 1 to about 20 minutes.

After curing, the substrate and electroconductive plug may be fired for as little as 1 second up to about 30 seconds at peak temperature, in a belt conveyor furnace in air. During firing, the conductive component within the electroconductive plug may be sintered.

Substrates

The electroconductive ink or paste compositions may be applied to the surface of any suitable substrate and subsequently cured to form electroconductive lines, patters or contacts thereon. The electroconductive ink or paste compositions may also be injected or otherwise disposed within a via hole of any suitable substrate and subsequently cured to form electroconductive plugs therein. In some instances, electroconductive ink or paste compositions may be used in the fabrication of solar cells. In some instances, electroconductive ink or paste compositions may be used in the fabrication of printed circuit boards (PCB's). In some instances, electroconductive ink or paste compositions may be used in the fabrication of integrated circuits (IC's). In other instances, electroconductive ink or paste compositions may be used in the fabrication of solar cells, disc and multilayer capacitors, chip resistors, disc and multilayer negative temperature coefficient (NTC) thermistors, disc and multilayer positive temperature coefficient (PTC) thermistors, disc and multilayer varistors, resonators, multilayer lead zirconate titanate (PZT) transducers, inductors, and multilayer ferrite beads.

In some instances, the substrate, with or without via holes, may be a ceramic, glass or coated glass. Suitable ceramics, glasses or coated glasses include but are not limited to, a silicate, fused quartz, a soda-lime glass, a fluorosilicate, a borosilicate, a borofluorosilicate, a woven fiberglass, a lead oxide, an aluminosilicate, a germanium-oxide, an indium-tin oxide (ITO), an indium-zinc oxide (IZO), an aluminum oxide, a cerium oxide, a zinc oxide, an aluminum-doped zinc oxide (AZO), an indium-doped cadmium oxide, a fluorine-doped tin oxide (FTO), beryllium oxide, barium stannate, aluminum nitride, titanium nitride, a zirconium oxide, and oxides of strontium vanadate and calcium vanadate.

In some instances, the substrate, with or without via holes, may be made of a conductive or non-conductive polymer such as, but not limited to, a polyacetylene or derivative thereof, a polyaniline or derivative thereof, a polypyrrole or derivative thereof, a polythiophene or derivative thereof, a polyimide or derivative thereof, a phenol formaldehyde resin, a polyvinylidene fluoride (PVDF), a polyethylene terephthalate (PET) or derivative thereof, a polycarbonate or derivative thereof, a polyacrylate or derivative thereof, a polymethacrylate or derivative thereof, a polyester or derivative thereof, a polyether ether ketone (PEEK) or derivative thereof, a poly-oxydiphenylene-pyromellitimide, poly(3,4-ethylenedioxythiophene) (PEDOT), PEDOT: poly (styrene sulfonate) (PSS), and poly(4,4-dioctyl cyclopentadithiophene).

In some instances, the substrate, with or without via holes, may be a silicon, a copper indium gallium sulfide/selenide ($Cu(In,Ga)(S,Se)_2$, or "CIGS"), a cadmium telluride, a copper zinc tin sulfide (CZTS), a silver zinc tin sulfide (AZTS), and gallium arsenide.

While being useful for the formation of electroconductive plugs within via holes of varying shapes and dimensions, the inventor has surprisingly found that the solvent-free electroconductive ink or paste compositions described herein are particularly useful for the filling via holes which have diameters of 100 µm or less and high aspect ratios (i.e., a high depth-to-width ratios), specifically aspect ratios of 5:1 or greater. In some instances, electroconductive ink or paste compositions described herein may be used to fill via holes which have diameters of 80 μm or less, alternatively 60 μm or less, alternatively 40 μm or less, and alternatively 20 μm or less. In some instances, electroconductive ink or paste compositions described herein may be used to fill via holes which have aspect ratios of 6:1 or greater, alternatively 7:1 or greater, alternatively 8:1 or greater, alternatively 9:1 or greater, alternatively 10:1 or greater, alternatively 15:1 or greater. Electroconductive plugs formed in such via holes exhibit little to no little to no cracking, void spaces or gaps within the plugs or at interfaces between the plugs and the interior surfaces of via holes. Also, electroconductive ink or paste compositions described herein, because they are solvent-free is, experience minimal volumetric losses or shrinkage upon curing, allowing for the formation of uniform electroconductive lines, on substrates, or plugs, within via holes, in a reliable and reproducible fashion.

EXAMPLES

Example 1

1.1—Electroconductive Ink Preparation

An electroconductive ink was prepared by combining 50 g of a silver powder, 4.46 grams of an epoxy resin (Epalloy® 8250), 0.86 g of a reactive diluent (Epodil® 759, an aliphatic glycidyl ether [$C_{12}$-$C_{13}$], Evonik Corporation), and 0.26 g of a curing agent (boron trifluoride ethylamine [$BF_3$:$C_2H_5NH_2$], Atotech). The combined materials were roll-milled to form the paste. After roll-milling, the paste exhibited a dynamic viscosity of 105 kcP.

1.2—Screen-Print Testing

Figure 2:
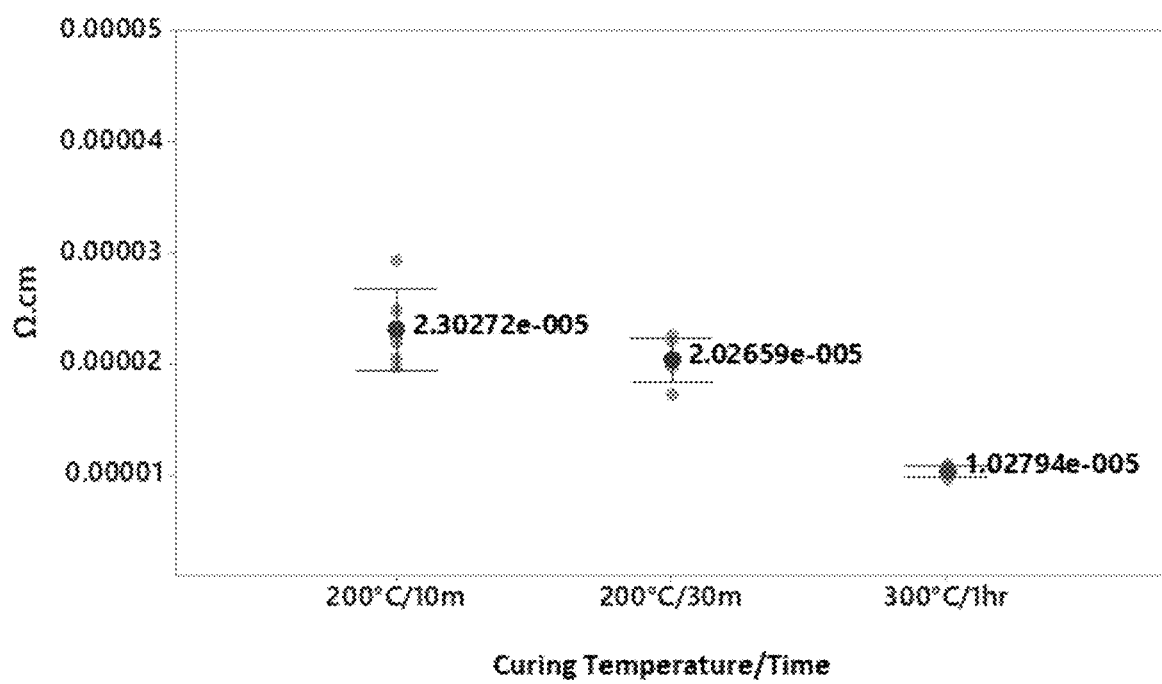
FIG. 2 is a graph displaying the resistivities of electroconductive line-coated substrates formed using an electroconductive composition cured under varying conditions.
Figure 3:
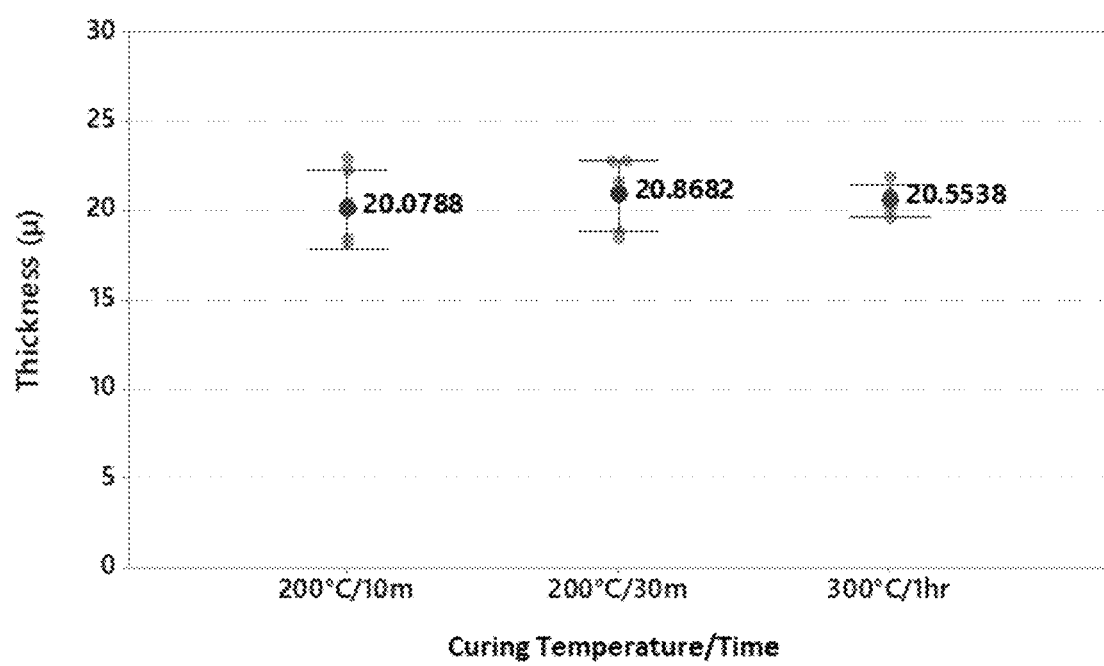
FIG. 3 is a graph displaying the thicknesses of electroconductive lines formed substrates from an electroconductive composition cured under varying conditions.

The ink of Example 1.1 was screen-printed in various patterns on Kapton substrates. Following screen-printing, the ink-coated Kapton substrates were cured, forming electroconductive lines of the Kapton substrates (FIG. 1). Different ink-coated Kapton substrates were cured under different conditions. In a first instance, an ink-coated Kapton substrate was cured at 200° C. for 10 minutes. In a second instance, an ink-coated Kapton substrate was cured at 200° C. for 30 minutes. In a third instance, an ink-coated Kapton substrate was cured at 200° C. for 10 minutes and cured again at 300° C. for 1 hour. After curing, the resistivities of the formed electroconductive line-coated Kapton substrates (FIG. 2) and the thickness of the electroconductive lines on the Kapton substrates (FIG. 3) were evaluated. Regarding resistivity, FIG. 2 indicates that the resistivity of electroconductive lines formed from an electroconductive ink of the disclosure decreases with longer curing times, higher curing temperatures, or a combination of longer curing times and higher curing temperatures. Regarding the thickness of the electroconductive lines, FIG. 3 indicates that, regardless of curing time and/or temperature, the overall thickness of the electroconductive lines do not change. This data indicates that there is no appreciable change in the volume, or shrinkage, of the electroconductive lines due to alteration of the curing procedure.

1.3—Via Hole Filling

Figure 4:
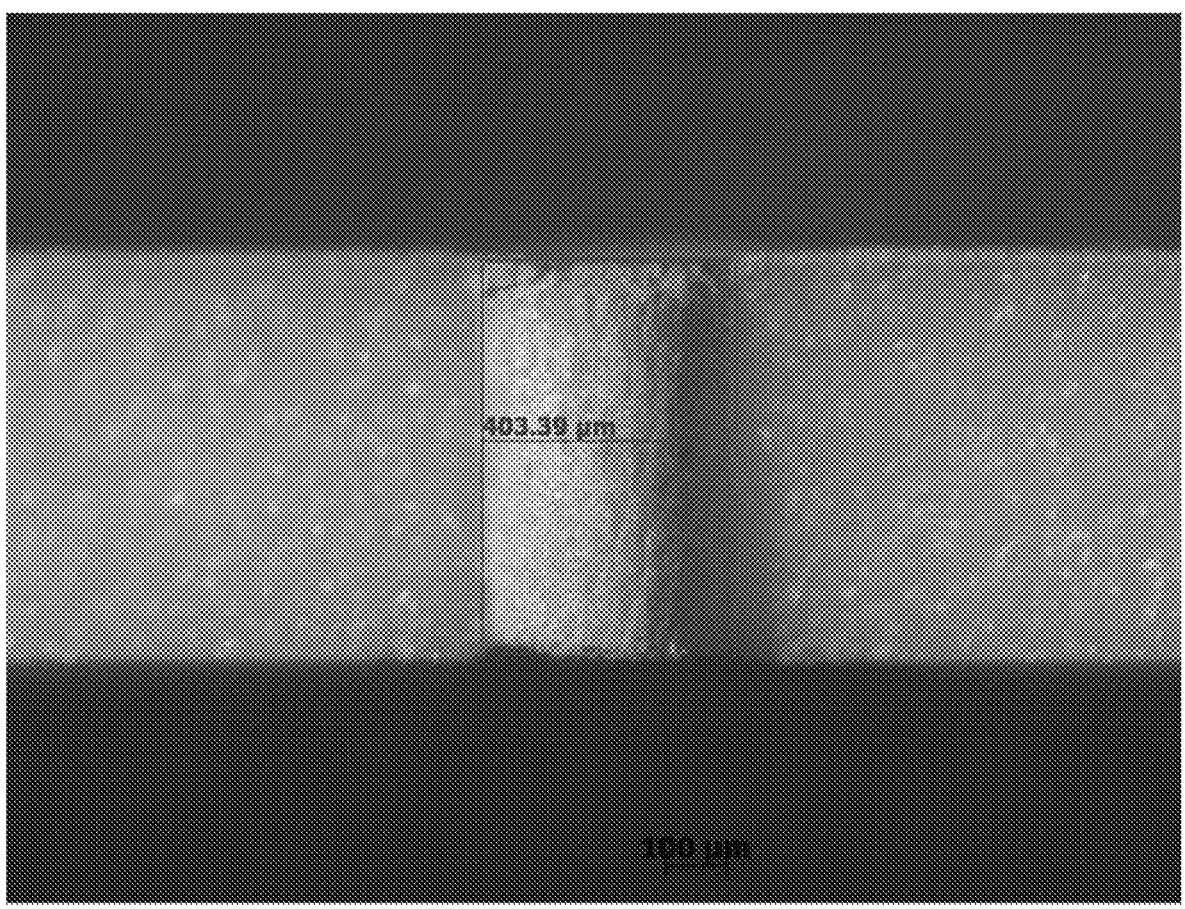
FIG. 4 is a magnified cross-sectional image of a via hole filled with an electroconductive plug, the electroconductive plug formed by curing an electroconductive composition within the via hole.

The ink of Example 1.1 was injected into, and filled, via holes of an aluminum oxide ($Al_2O_3$) substrate. The via holes were approximately 646 micrometers in depth and 403 micrometers in diameter. The ink was subsequently cured at 300° C. for 1 hour to form electroconductive plugs within the via holes. FIG. 4 is a magnified cross-sectional image of a via hole filled with an electroconductive plug according to this example. No appreciable shrinkage was observed as a result of the curing process, indicating that the conversion of the ink of Example 1.1 to plugs occurs without loss of volume.

Example 2

2.1—Electroconductive Ink Preparation

An electroconductive ink was prepared by combining 1000 g of a silver powder, 89.2 grams of an epoxy resin (Epalloy® 8250), 17.2 g of a reactive diluent (Epodil® 759, an aliphatic glycidyl ether [$C_{12}$-$C_{13}$], Evonik Corporation), and 5.2 g of a curing agent (boron trifluoride ethylamine [$BF_3$:$C_2H_5NH_2$], Atotech). The combined materials were roll-milled to form the paste. After roll-milling, the paste exhibited a dynamic viscosity of 95 kcP.

2.2—Via Hole Filling

Figure 5:
FIG. 5 is a magnified cross-sectional image of another via hole filled with an electroconductive plug, the electroconductive plug formed by curing an electroconductive composition within the via hole.

The ink of Example 2.1 was injected into a via hole of a substrate. The via hole was approximately 400 micrometers in depth and 40 micrometers in diameter. By way of profilometry, it was determined that the via hole was only partially filled with the ink such that the top-most 9 micrometers of the via hole was devoid of ink. The ink was then cured by heating from 200 to 300° C. over a period of 10 minutes, and then heating at 300° C. for 50 minutes to form an electroconductive plug within the via hole. After curing, the top-most 10 micrometers of the via hole was not filled with the electroconductive plug. FIG. 5 is a magnified cross-sectional image of a via hole filled with an electroconductive plug according to this example. As with Example 1.3, no appreciable shrinkage was observed as a result of the curing process, indicating that the conversion of the ink of Example 2.1 to plugs occurs with minimal loss of volume.

2.3—Via Hole Filling

The ink of Example 2.1 was injected into a via hole of a glass substrate. The via hole was approximately 403 micrometers in depth and 83.4 micrometers in diameter. Using profilometry, it was determined that the via hole was only partially filled with the ink such that the top-most 8 micrometers and the bottom-most 8 micrometers of the via hole was devoid of ink (that is, the middle 387 micrometers of the via hole were filled with the ink). The ink was then cured by heating from 200 to 300° C. over a period of 20 minutes, and then heating at 300° C. for 30 minutes to form an electroconductive plug within the via hole. After curing, the top-most 30 micrometers and a bottom-most 20 micrometers of the via hole was not filled with the electroconductive plug (that is, the middle 353 micrometers of the via hole were filled with the electroconductive plug).

2.4—Via Hole Filling

Figure 6:
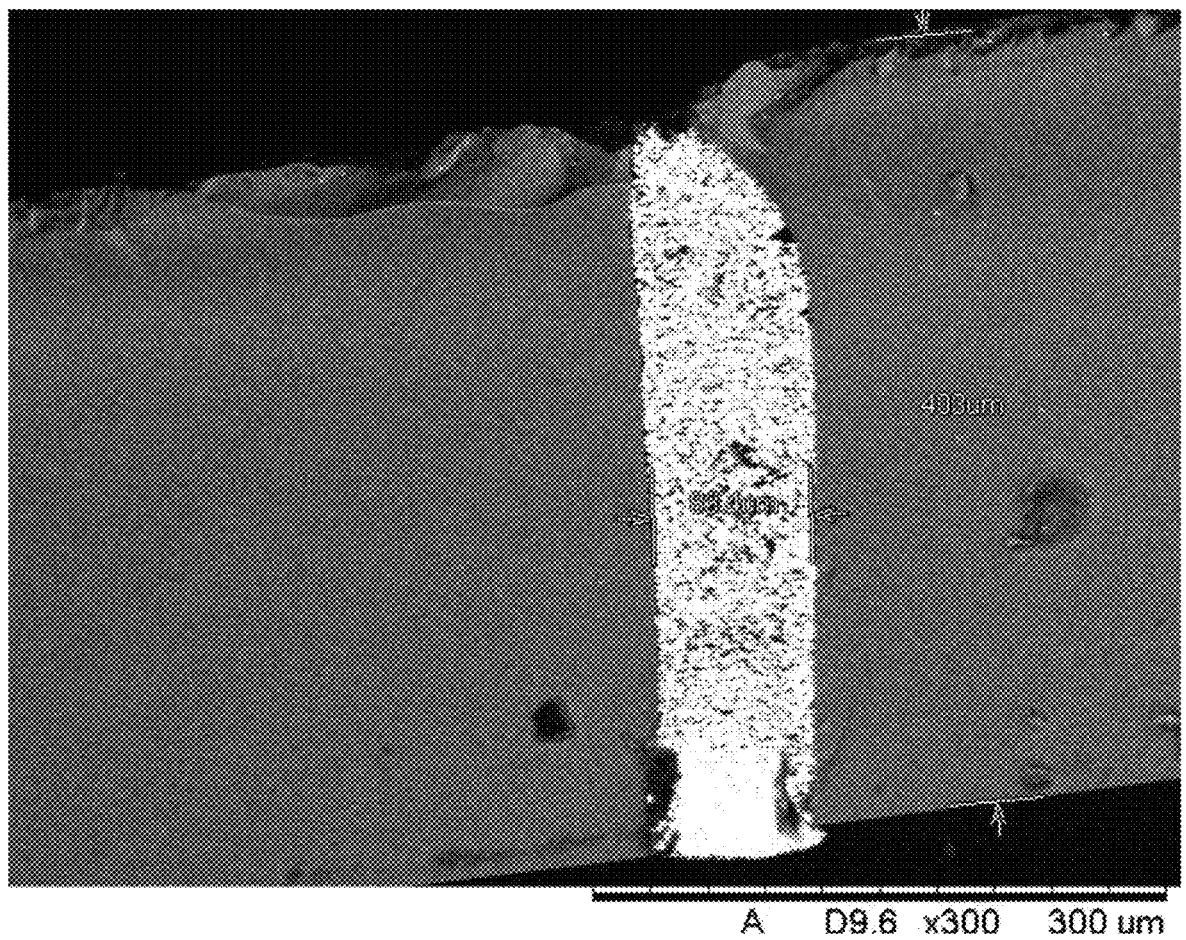
FIG. 6 is a scanning electron microscope (SEM) cross-sectional image of another via hole filled with an electroconductive plug the electroconductive plug formed by curing an electroconductive within the via hole.
Figure 7:
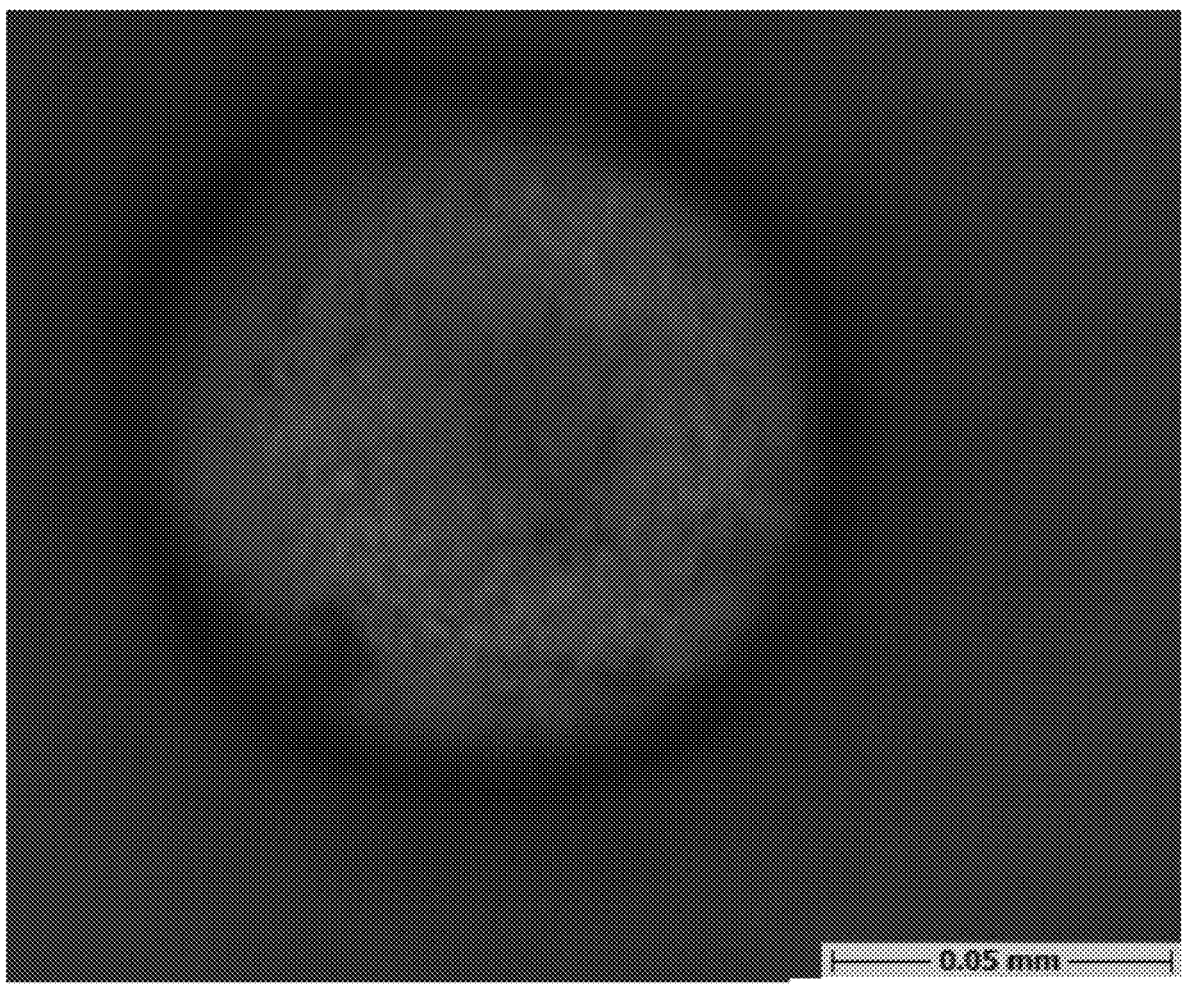
FIG. 7 is an optical microscopy image of a top of the electroconductive plug shown in FIG. 6.

The ink of Example 2.1 was injected into a via hole of a glass substrate. The via hole was approximately 403 micrometers in depth and 83.4 micrometers in diameter. The ink was then cured by heating from 200 to 300° C. over a period of 20 minutes, and then heating at 300° C. for 30 minutes to form an electroconductive plug within the via hole. FIG. 6 is a scanning electron microscope (SEM) cross-sectional image of a via hole filled with an electroconductive plug according to this example. FIG. 7 is an optical microscopy image of a top of the electroconductive plug produced according to this example. No cracks or void appear to be present in the electroconductive plug as viewed in FIGS. 6-7.

The invention claimed is:

1. A solvent-free electroconductive composition, the composition comprising:

about 85 to about 90 wt % of metallic particles having a $D_{50}$ ranging from about 100 nm to about 5.0 μm wherein the metallic particles comprise silver;

about 7 to about 9 wt % of an epoxy resin;

about 1 to about 3 wt % of an aliphatic glycidyl ether; and about 0.4 to about 0.6 wt % of boron trifluoride ethylamine.

2. The composition of claim 1, wherein the composition is a paste or an ink.

3. The composition of claim 1, wherein the composition has a viscosity ranging from about 40 kcP to 300 kcP at 25° C.

4. The composition of claim 1, wherein at least a portion of the metallic particles are spherical or substantially spherical.

5. The composition of claim 1, wherein the metallic particles have a $D_{50}$ from about 500 nm to about 3.5 μm.

6. The composition of claim 1, wherein
the metallic particles are silver particles.

7. The composition of claim 1, further comprising a lubricating compound, wherein the composition contains no more than 3 wt % of the lubricating compound.

8. The composition of claim 1, wherein the epoxy resin is an epoxy phenol novolac resin.

9. The composition of claim 1, wherein the aliphatic glycidyl ether is a $C_8$-$C_{10}$ alkyl glycidyl ether, a $C_{10}$-$C_{12}$ alkyl glycidyl ether, a $C_{12}$-$C_{13}$ alkyl glycidyl ether, or a $C_{12}$-$C_{14}$ alkyl glycidyl ether.

* * * * *